US012748402B2

(12) United States Patent
Huang et al.

(10) Patent No.: US 12,748,402 B2
(45) Date of Patent: Sep. 29, 2026

(54) CONTROLLING AN INDUSTRIAL MOVER SYSTEM BASED ON SUSTAINABILITY FACTORS

(71) Applicant: Rockwell Automation Technologies, Inc., Mayfield Heights, OH (US)

(72) Inventors: Yuhong Huang, Acton, MA (US); Alexandra L. Schwertner, Cleveland, OH (US); Andrea Ruotolo, Ontario (CA); Kyle Crum, Bayside, WI (US); Joshua W. Connor, Sussex, WI (US); Jason R. Mannion, Havertown, PA (US); Sinethemba Zulu, Johannesburg (ZA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 411 days.

(21) Appl. No.: 18/477,017

(22) Filed: Sep. 28, 2023

(65) Prior Publication Data

US 2025/0110476 A1 Apr. 3, 2025

(51) Int. Cl.
*G05B 19/4155* (2006.01)

(52) U.S. Cl.
CPC .................... *G05B 19/4155* (2013.01); *G05B 2219/31266* (2013.01)

(58) Field of Classification Search
CPC .................. G05B 19/4155; G05B 2219/31266
See application file for complete search history.

(56) References Cited

U.S. PATENT DOCUMENTS

| | | | |
|---|---|---|---|
| 7,479,751 | B2 | 1/2009 | Sladek et al. |
| 8,321,187 | B2 | 11/2012 | Kaufman et al. |
| 8,648,708 | B2 | 2/2014 | Lombardi et al. |
| 8,670,962 | B2 | 3/2014 | Kaufman et al. |
| 8,738,190 | B2 | 5/2014 | Pai et al. |
| 8,831,927 | B2 | 9/2014 | March |
| 8,892,540 | B2 | 11/2014 | Walker et al. |

(Continued)

FOREIGN PATENT DOCUMENTS

| | | | |
|---|---|---|---|
| CN | 116207844 | A | 6/2023 |
| CN | 219368457 | U | 7/2023 |
| KR | 20230105983 | A | 7/2023 |

*Primary Examiner* — Kenneth M Lo
*Assistant Examiner* — Mohammed Shafayet
(74) *Attorney, Agent, or Firm* — Fletcher Yoder, P.C.

(57) ABSTRACT

A mover system includes a track, a plurality of movers configured to move along the track, and one or more processors configured to determine a first amount of energy consumption associated with a first portion of the plurality of movers and a second amount of energy consumption associated with a second portion of the plurality of movers and determine a first emissions per unit for each of the first portion of the plurality of movers based on the first amount of energy consumption and a second emissions per unit for each of the second portion of the plurality of movers based on the second amount of energy consumption. The one or more processors are also configured to determine one or more operating settings for the mover system based on the first emissions per unit, the first emissions per unit, or both and send one or more commands to the first number of the plurality of movers, the second number of the plurality of movers, or both based on the one or more operating settings.

20 Claims, 11 Drawing Sheets

(56) References Cited

U.S. PATENT DOCUMENTS

| | | | | |
|---|---|---|---|---|
| 9,129,231 | B2 | 9/2015 | Kaufman et al. | |
| 9,274,518 | B2 | 3/2016 | Pai et al. | |
| 9,304,963 | B2 | 4/2016 | Xiao et al. | |
| 9,354,651 | B2 | 5/2016 | Schmidt et al. | |
| 9,395,704 | B2 | 7/2016 | Pai et al. | |
| 9,406,036 | B2 | 8/2016 | Kaufman et al. | |
| 9,423,848 | B2 | 8/2016 | Keller et al. | |
| 9,501,804 | B2 | 11/2016 | Kaufman | |
| 9,684,288 | B2 | 6/2017 | Schmidt et al. | |
| 9,785,126 | B2 | 10/2017 | Kaufman | |
| 9,798,343 | B2 | 10/2017 | Kaufman | |
| 9,842,372 | B2 | 12/2017 | Kaufman | |
| 9,911,163 | B2 | 3/2018 | Kaufman | |
| 10,013,666 | B2 | 7/2018 | Walker et al. | |
| 10,223,167 | B2 | 3/2019 | Kaufman et al. | |
| 10,726,026 | B2 | 7/2020 | Walker et al. | |
| 11,715,559 | B2 | 8/2023 | Naik et al. | |
| 2009/0281677 | A1* | 11/2009 | Botich | G06Q 10/00 705/400 |
| 2010/0274377 | A1* | 10/2010 | Kaufman | G06Q 10/06 700/103 |
| 2010/0274602 | A1* | 10/2010 | Kaufman | G05B 23/0254 705/7.38 |
| 2016/0147242 | A1* | 5/2016 | Kaufman | G05B 15/02 700/291 |
| 2017/0226764 | A1* | 8/2017 | Nussbaum | E04H 6/24 |
| 2018/0031533 | A1* | 2/2018 | Rawat | G06Q 50/06 |
| 2018/0370734 | A1* | 12/2018 | Ziegler | G01G 11/003 |
| 2023/0236559 | A1 | 7/2023 | Kumar et al. | |
| 2023/0238799 | A1 | 7/2023 | Pan et al. | |
| 2024/0388130 | A1* | 11/2024 | Rajan | H02J 3/381 |

* cited by examiner

572

574 576

| GRID REGION-LOCATION BASED | CO2 FACTOR (kg / kWh) |
|---|---|
| U.S. | 0.429634528 |
| CA | 0.13 |
| SOUTH AUSTRALIA | 0.44 |
| SWIS IN WESTERN AUSTRALIA | 0.69 |
| NORTH TERRITORY | 0.63 |
| NORTH CHINA GRID | 0.968 |
| EAST CHINA GRID | 0.8046 |
| CENTRAL CHINA GRID | 0.9014 |
| CHINA NORTHWEST GRID | 0.9155 |
| CHINA SOUTHERN GRID | 0.8367 |

CONTROLLING AN INDUSTRIAL MOVER SYSTEM BASED ON SUSTAINABILITY FACTORS

BACKGROUND

This disclosure relates generally to industrial automation systems. More particularly, embodiments of the present disclosure are related to systems and methods for determining sustainability factor data and controlling manufacturing processes of an industrial automation system based on the sustainability factor data.

Producers, distributors, and consumers are becoming increasingly interested in contributing to a sustainable future and addressing environmental concerns such as reducing greenhouse gas emissions, reducing water consumption, improving energy demand, improving waste management, and so on. Generally, industrial automation systems track, analyze, and average data associated with sustainability factors (e.g., energy consumption, water consumption, emissions, waste, and so on) after completing a manufacturing process of a product. However, the sustainability factor data at each location (e.g., at each fixed station) or in between each location (e.g., data during transportation of the product), at a particular time of day, and at a particular geographical location of manufacturing may be unavailable or limited. Thus, producers, distributors, and consumers may lack information related to the sustainability factors as the product advances through the manufacturing process. Accordingly, improved systems and methods for monitoring and determining the sustainability factor data as the product advances through the manufacturing process and implementing adjustments to improve sustainability factor consumption may be desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a mover system includes a track, a plurality of movers configured to move along the track, and one or more processors configured to determine a first amount of energy consumption associated with a first portion of the plurality of movers and a second amount of energy consumption associated with a second portion of the plurality of movers and determine a first emissions per unit for each of the first portion of the plurality of movers based on the first amount of energy consumption and a second emissions per unit for each of the second portion of the plurality of movers based on the second amount of energy consumption. The one or more processors are also configured to determine one or more operating settings for the mover system based on the first emissions per unit, the first emissions per unit, or both and send one or more commands to the first number of the plurality of movers, the second number of the plurality of movers, or both based on the one or more operating settings.

In another embodiment, a non-transitory computer-readable medium includes instructions that, when executed by one or more processors, cause the one or more processors to determine a first amount of energy consumption associated with a first portion of the plurality of movers and a second amount of energy consumption associated with a second portion of the plurality of movers and determine a first emissions per unit for each of the first portion of the plurality of movers based on the first amount of energy consumption and a second emissions per unit for each of the second portion of the plurality of movers based on the second amount of energy consumption. When executed, the instructions also cause the one or more processors to determine one or more operating settings for the mover system based on the first emissions per unit, the first emissions per unit, or both and send one or more commands to the first number of the plurality of movers, the second number of the plurality of movers, or both based on the one or more operating settings.

In yet another embodiment, a method includes determining, via processing circuitry, a first amount of energy consumption associated with a first portion of the plurality of movers and a second amount of energy consumption associated with a second portion of the plurality of movers and determining, via the processing circuitry, a first emissions per unit for each of the first portion of the plurality of movers based on the first amount of energy consumption and a second emissions per unit for each of the second number of the plurality of movers based on the second amount of energy consumption. The method also includes determining, via the processing circuitry, one or more operating settings for the mover system based on the first emissions per unit, the first emissions per unit, or both and sending, via the processing circuitry, one or more commands to the first number of the plurality of movers, the second number of the plurality of movers, or both based on the one or more operating settings.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION DRAWINGS

These and other features, aspects, and advantages of the present embodiments will become better understood when the following detailed description is read with reference to the accompanying drawings in which like characters represent like parts throughout the drawings, wherein FIG. 1 illustrates an example industrial automation system employed by a food manufacturer, in accordance with embodiments of the present disclosure;

Figure 12:
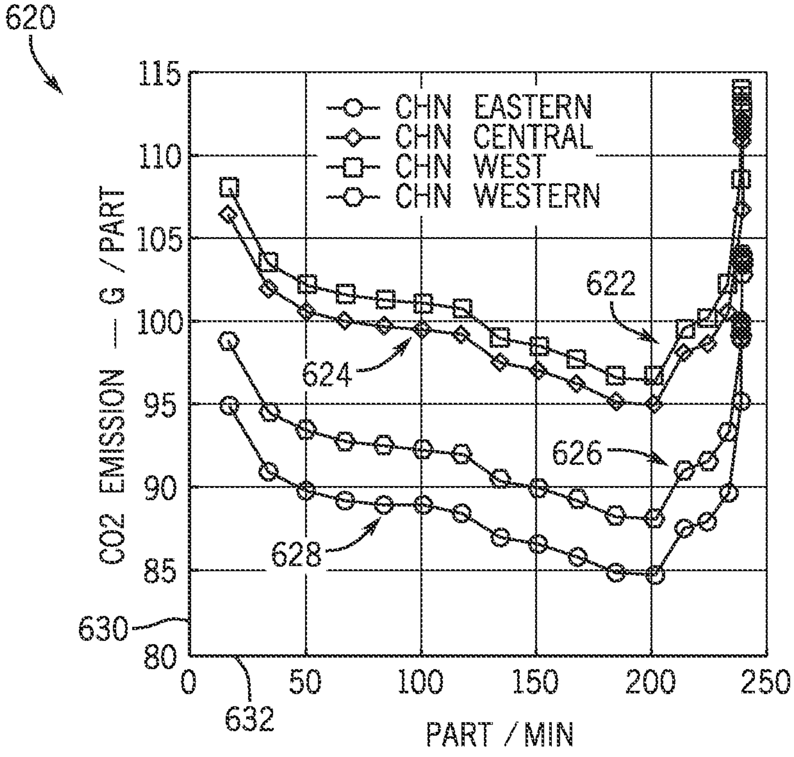
Figure 13:
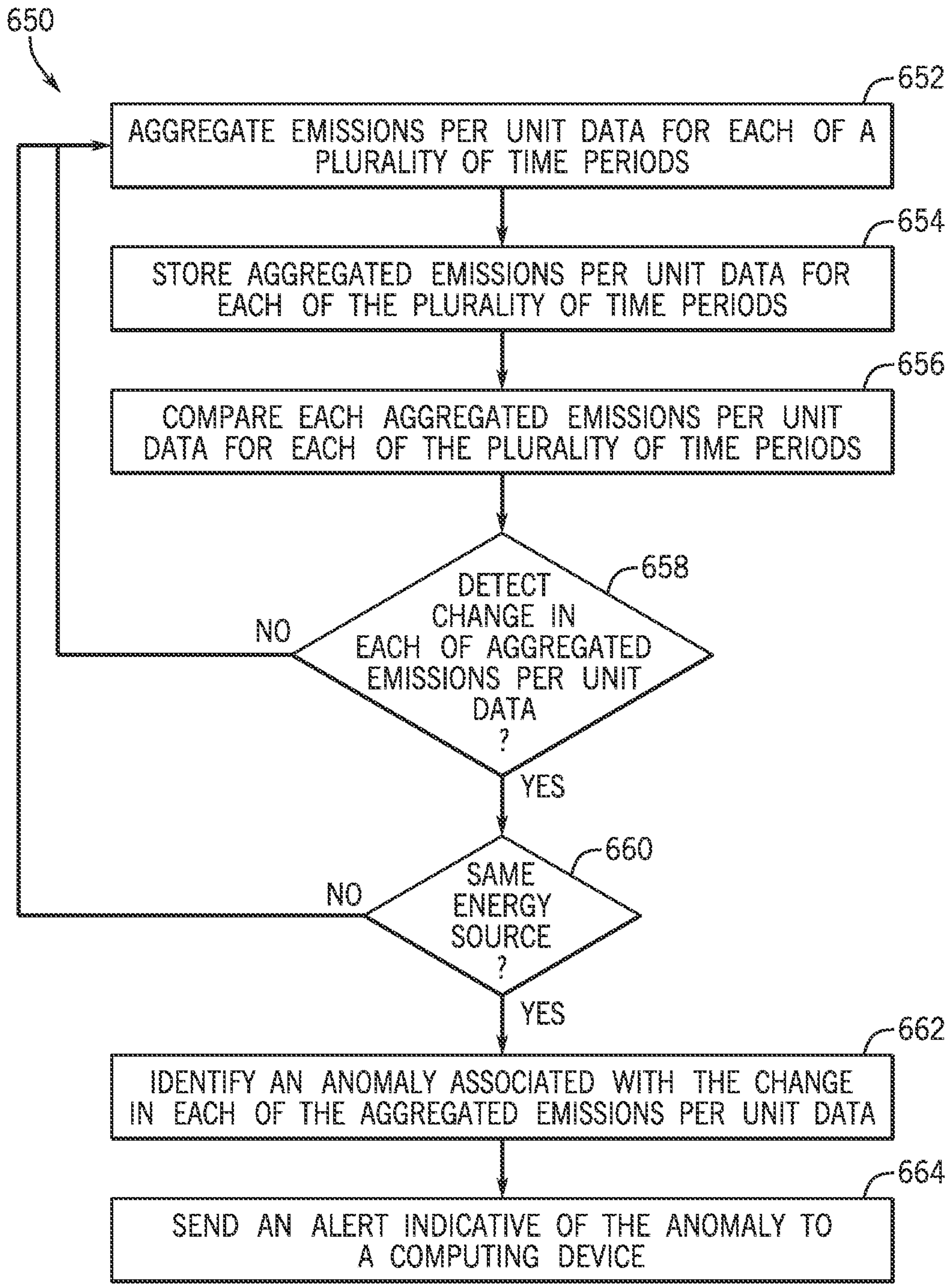

FIG. 12 is a graph indicative of expected carbon emissions versus the number of parts produced by the mover system per minute associated with different regions of the geographical region, in accordance with embodiments of the present disclosure; and FIG. 13 is a flow diagram for identifying an anomaly in the mover system based on aggregated emissions data, in accordance with embodiments of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As described above, sustainability factor data at each location (of a fixed station), or in between each location (during transportation of a product from the fixed station to another fixed station), at a particular time of day, and at a particular geographical region may be unavailable or limited. As such, improved systems and methods for monitoring and determining sustainability factor data and implementing adjustments to operating equipment in an industrial system to improve sustainability factor consumption may be desired.

With this in mind, the present disclosure is related to an industrial automation system that may implement sustainability factor consumption analysis to determine sustainability factor data and control manufacturing processes based on the sustainability factor data. An industrial control system may monitor and maintain various types of sustainability factor data such as energy consumption data, water consumption data, carbon emissions data, waste data, and the like at various stations to capture sustainability factor data associated with manufacturing a product from the beginning of a manufacturing process to the end of the manufacturing process. That is, the industrial control system may receive motion data associated with a product or raw materials transitioning to one location (e.g., fixed station) and machine data associated with processing performed on the product or materials at the respective location. The industrial control system may collect motion and machine data at various stations or parts of the industrial automation system then determine the sustainability factor data associated with the processing, transporting, or production of the product based on the motion data and the machine data collected at the various stations. In some embodiments, as materials or a product moves to each station within the industrial automation system, the industrial control system may maintain or update a record, which may include aggregated sustainability factor data associated with manufacturing an individual product during the course of the manufacturing process at each of the stations. As such, the various types of aggregated sustainability data may be tracked in real time, enabling dynamic altering of the industrial automation process to increase optimization, improve sustainability factors, and amplify efforts in addressing environmental issues.

In an embodiment, the industrial control system may also track aggregate energy consumption data, aggregate water consumption data, aggregate carbon emissions data, aggregate waste data for the product. These aggregated datasets may represent a cumulative amount of the respective property consumed or used for producing the respective product as determined or detected at various stations within the industrial automation system. In this way, after the product is manufactured, the industrial control system may produce a label including the aggregate energy consumption data, the aggregate water consumption data, the aggregate carbon emissions data, the aggregate waste data, or the like and associate the label with the respective product. In this way, the actual sustainability data for producing the respective product may be dynamically determined in real time. Further, the industrial control system may update a storage component based on the label for the individual product to track trends and history of sustainability parameters associated with manufacture of a number of the products at the respective industrial system. The industrial control system may use the tracked sustainability parameters to identify operating parameters, transport equipment, and other properties that may be modified to enable other industrial systems to improve their respective sustainability parameters with respect to manufacturing one or more products.

In another embodiment, a mover system may be implemented and/or controlled based on determined emissions per unit. That is, operating settings for the mover system may be determined based on operational parameters and desired emissions per unit of a fleet size that may be selected by a user. The mover system may then be controlled in accordance with the operating settings. For example, the mover system may be operated in a manner that minimizes the emissions produced (e.g., the emissions per part of unit produced using the mover system), minimizes an overall environmental footprint (e.g., energy consumed, emissions), maximizes the number of parts or units produced, and the like. In another example, in some embodiments, a sustainability control system may receive aggregated emissions per unit data for each of a plurality of time periods. The sustainability control system may then compare each of the aggregated emissions per time period data to determine whether one the aggregated emissions datasets differs from one or more other aggregated emissions datasets by more than a threshold amount. If there is the change, the sustainability control system may determine whether a sustainability parameter or operating parameter has changed (e.g., if the same energy source is being used). If the aggregated emissions datasets differ by more than some threshold, the sustainability control system may determine that an anomaly is present with respect to one of the time periods. As such, the sustainability control system may determine whether different operating parameters, sustainability parameters, or other parameters may account for the difference to identify the respective parameters to employ to maximize a desired sustainability parameter (e.g., minimize energy use, reduce emissions). Additional details with regard to identifying and implementing improved operations to achieve various sustainability goals will be discuss below with reference to FIGS. 1-13.

Figure 1:
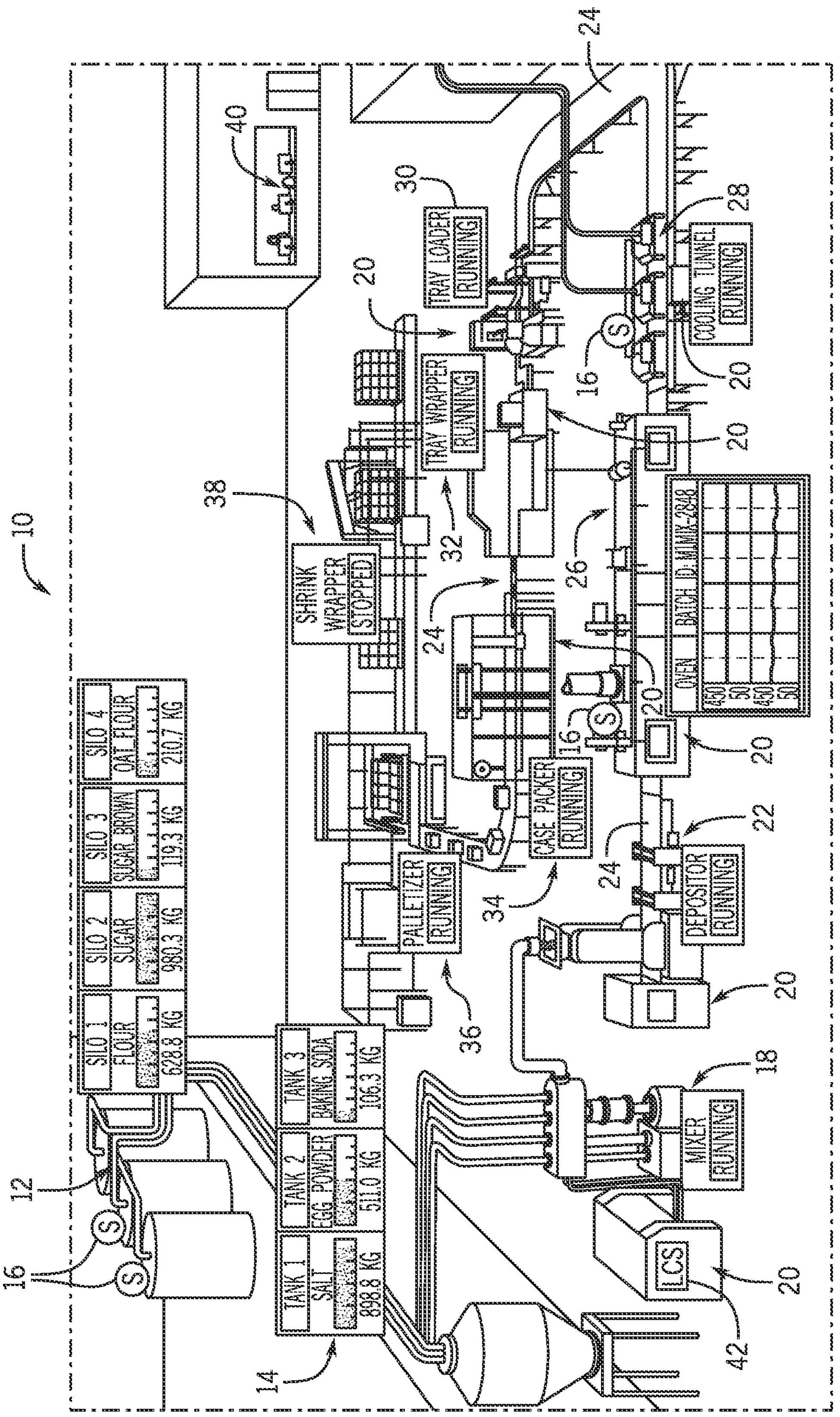

By way of introduction, FIG. 1 illustrates an example industrial automation system 10 employed by a food manufacturer. It should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

Figure 2:
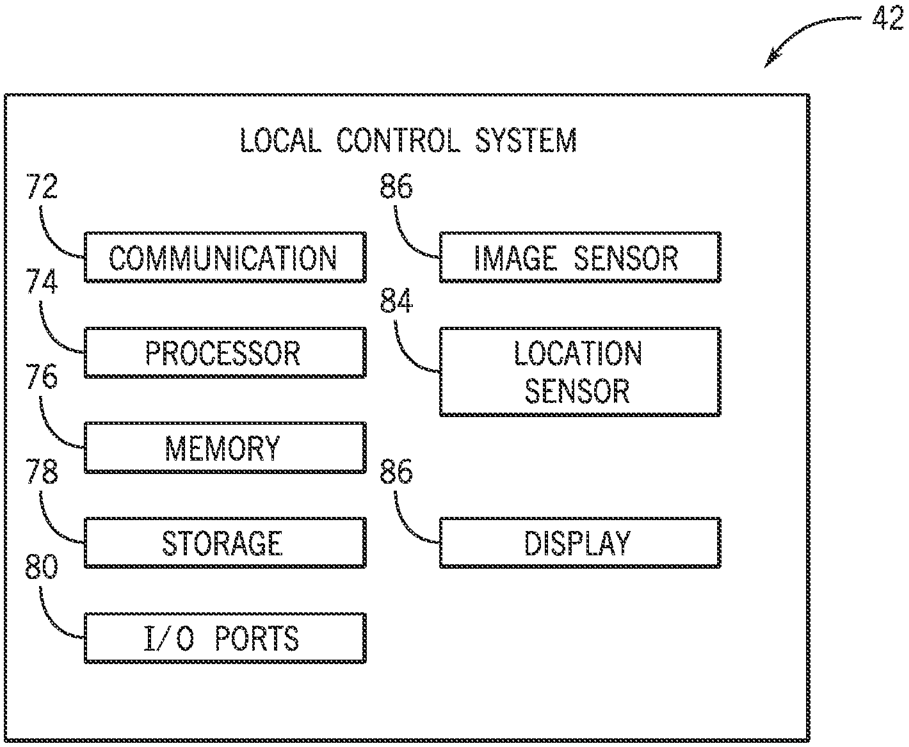
FIG. 2 illustrates example components that may be part of a control/monitoring device in a control system for the industrial automation system, in accordance with embodiments of the present disclosure.

In any case, FIG. 2 illustrates example components that may be part of the local control system 42, in accordance with embodiments presented herein. For example, the local control system 42 may include a communication component 72, a processor 74, a memory 76, a storage 78, input/output (I/O) ports 80, an image sensor 82 (e.g., a camera), a location sensor 84, a display 86, additional sensors (e.g., vibration sensors, temperature sensors), and the like. The communication component 72 may be a wireless or wired communication component that may facilitate communication between the industrial automation devices 20, the supervisory control system 40, the local control system 42, and other communication capable devices.

The processor 74 may be any type of computer processor or microprocessor capable of executing computer-executable code. The processor 74 may also include multiple processors that may perform the operations described below. The memory 76 and the storage 78 may be any suitable articles of manufacture that can serve as media to store processor-executable code, data, or the like. These articles of manufacture may represent computer-readable media (e.g., any suitable form of memory or storage) that may store the processor-executable code used by the processor 74 to perform the presently disclosed techniques. Generally, the processor 74 may execute software applications that include programs that enable a user to track and/or monitor operations of the industrial automation devices 20 via a local or remote communication link. That is, the software applications may communicate with the local control system 42 and gather information associated with the industrial automation devices 20 as determined by the local control system 42, via the sensors 16 disposed on the industrial automation devices 20 and the like.

The memory 76 and the storage 78 may also be used to store the data, analysis of the data, the software applications, and the like. The memory 76 and the storage 78 may represent non-transitory computer-readable media (e.g., any suitable form of memory or storage) that may store the processor-executable code used by the processor 74 to perform various techniques described herein. It should be noted that non-transitory merely indicates that the media is tangible and not a signal.

In one embodiment, the memory 76 and/or storage 78 may include a software application that may be executed by the processor 74 and may be used to monitor, control, access, or view one of the industrial devices 20. As such, the local control system 42 may communicatively couple to the industrial automation devices 20 or to a respective computing device of the industrial automation devices 20 via a direct connection between the devices or via the cloud-based computing system 58. The software application may perform various functionalities, such as track statistics of the industrial automation device 20, store reasons for placing the industrial automation devices 20 offline, determine reasons for placing the industrial automation devices 20 offline, secure the industrial automation devices 20 that are offline, deny access to place an offline industrial automation device 20 back online until certain conditions are met, and so forth.

The I/O ports 80 may be interfaces that may couple to other peripheral components such as input devices (e.g., keyboard, mouse), sensors, input/output (I/O) modules, and the like. I/O modules may enable the computing device 66 or other local control systems 42 to communicate with the industrial automation devices 20 or other devices in the industrial automation system 10 via the I/O modules.

The image sensor 82 may include any image acquisition circuitry such as a digital camera capable of acquiring digital images, digital videos, or the like. The location sensor 84 may include circuitry designed to determine a physical location of the local control system 42. In one embodiment, the location sensor 84 may include a global positioning system (GPS) sensor that acquires GPS coordinates for the local control system 42.

The display 86 may depict visualizations associated with software or executable code being processed by the processor 74. In one embodiment, the display 86 may be a touch display capable of receiving inputs (e.g., parameter data for operating the industrial devices 20) from a user of the local control system 42. As such, the display 86 may serve as a user interface to communicate with the industrial automation devices 20. The display 86 may be used to display a graphical user interface (GUI) for operating the industrial automation devices 20, for tracking the maintenance of the industrial automation devices 20, and the like. The display 86 may be any suitable type of display, such as a liquid crystal display (LCD), plasma display, or an organic light emitting diode (OLED) display, for example. Additionally, in one embodiment, the display 86 may be provided in conjunction with a touch-sensitive mechanism (e.g., a touch screen) that may function as part of a control interface for the industrial automation devices 20 or for a number of pieces of industrial automation equipment in the industrial automation system 20, to control the general operations of the industrial automation system 10. In some embodiments, the operator interface may be characterized as a human machine interface (HMI) 52 or the like.

Although the components described above have been discussed with regard to the local control system 42, it should be noted that similar components may make up other computing devices described herein. Further, it should be noted that the listed components are provided as example components and the embodiments described herein are not to be limited to the components described with reference to FIG. 2. Moreover, although the following description of various techniques implemented herein are discussed as being performed by the local control system 42, it should be understood that, in other embodiments, the techniques described herein may be performed by any suitable computing device.

Figure 3:
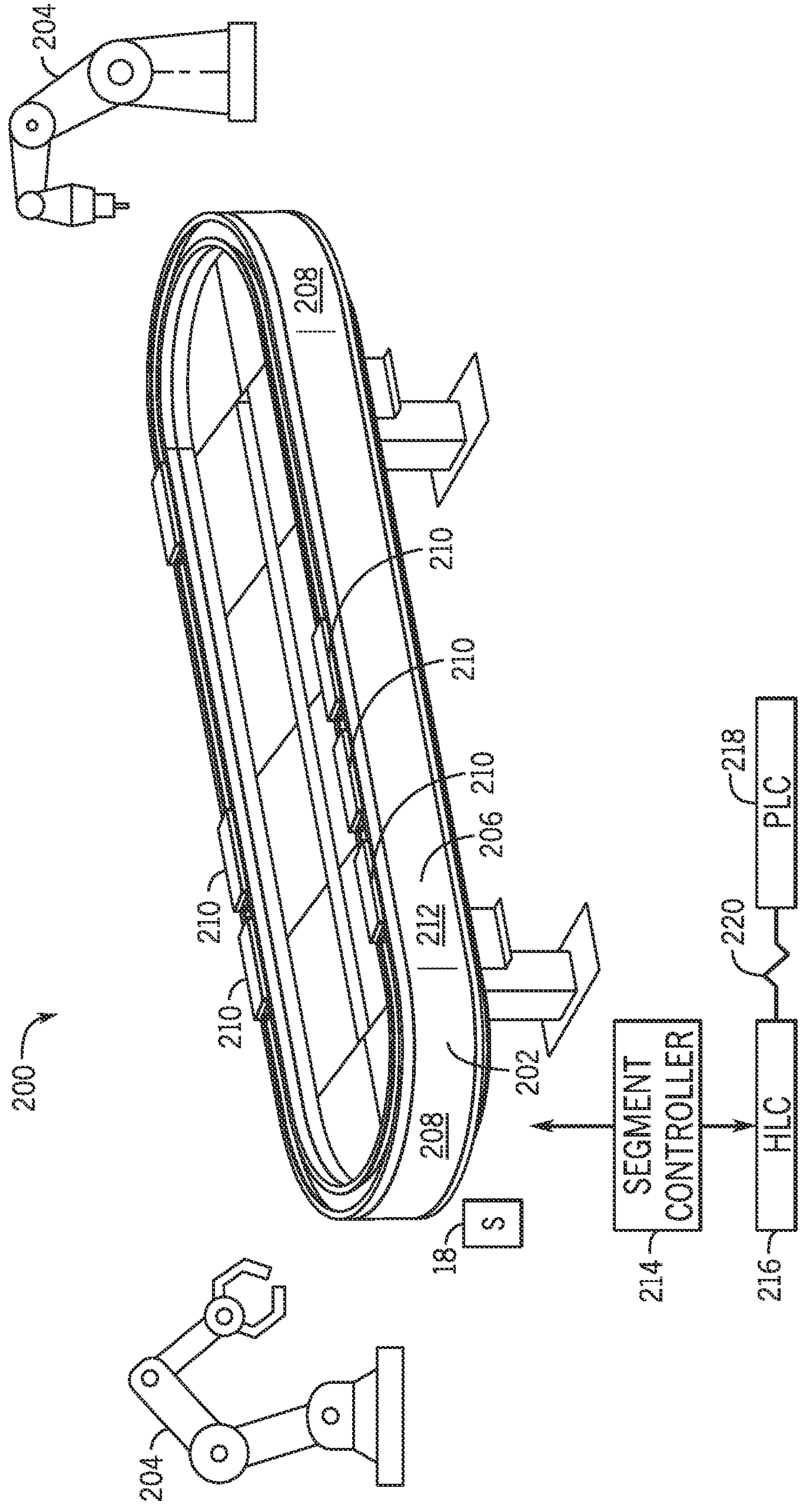
FIG. 3 is a perspective view of an embodiment of a mover system having mover assemblies positioned for movement along a track, which may be utilized in the industrial automation system of FIG. 1, in accordance with embodiments of the present disclosure.

Keeping the foregoing in mind, FIG. 3 is a perspective view of an embodiment of a mover system 200 (e.g., the conveyor section 24 of FIG. 1) that may be employed by the industrial automation system 10 and controlled by the local control system 42 to move articles or products around a track 202. As will be appreciated by those skilled in the art, in many applications, the mover system 200 may inter-operate with one or more robots 204, machines, conveyers, control equipment, and so forth in an overall automation, packaging, material handling or other application. In the illustrated embodiment, the track 202 includes multiple straight track sections 206 and multiple curved track sections 208. These track sections 206, 208 may be generally self-contained and mountable in various physical configurations, such as in the oval illustrated in FIG. 3. It should be noted that other configurations are also possible as discussed below. The configurations may form closed loops of various shapes but may also include open-ended segments.

The mover system 200 may also include one or more mover assemblies 210, which may be mounted to and movable along the track 202. The position, velocity, acceleration, and/or higher order derivative parameters may be controllable for these mover assemblies 210. The mover assemblies 210 may interact with stationary elements in and around an outer periphery 212 of the track 202, although other configurations are envisaged. Each mover assembly 210 may include a mounting platform. Various tools, holders, support structures, loads, and so forth may be mounted to this mounting platform. The mover assemblies 210 themselves may be configured differently from those shown in order accommodate the various loads. While a horizontal configuration is illustrated in FIG. 3, other orientations may also be provided, such as ones in which the illustrated oval is generally stood on a side or end, or at any angle.

The local control system 42 may position, accelerate, decelerate, and generally move the mover assemblies 210 under the influence of controlled magnetic and electromagnetic fields. For example, drive circuitry, such as a segment controller 214 of the local control system 42 may provide signals to each track section 206, 208, and specifically to individual coils of the track sections 206, 208, to create electromotive forces that interact with magnets on the track sections 206, 208 to drive the mover assemblies 210 to specific locations and/or at specific velocity, accelerations, and so forth. In some embodiments, the segment controller may regulate motion states, control of movers, and anti-collision of movers. The segment controller 214 may typically include inverter circuitry that makes use of power electronic switches to provide drive power to the individual coils of each section in a controlled manner. In some embodiments, the segment controller 214 may be included in each individual track section 206, 208. Power and control circuitry, such as a high-level controller (HLC) 216 of the local control system 42 may provide signals (e.g., move commands and/or various control signals) to the segment controller 214. A control/monitoring device, such as a PLC 218 may be linked to the mover system 200 and the local control system 42 by one or more networks 220. During operation, the PLC 218 may allow for coordination of the operation of the mover system 200 with other automation components, machine systems, manufacturing and material handling machines, and so forth. For example, the PLC 218 may receive data from the sensors 16 to detect various features, such as the location, position, orientation, velocity, acceleration, and so forth, of each individual mover assembly 210 and output control signals to the HLC 216 to control operation of the segment controller 214 to move the mover assemblies 210.

In certain embodiments, the PLC 218 may independently control each mover assembly 210. That is, the PLC 218 may regulate the position, velocity, and/or acceleration of each mover assembly 210 to move objects to intended locations while avoiding conflicts, collisions, and so forth. For example, the PLC 218 may cause the segment controller 214 to provide power to different coils of the track sections 206, 208 independently of one another (e.g., to control the coils that are energized and de-energized) to drive movement of the mover assemblies 210 separately from one another. The particular motion profile implemented by the HLC 216 may typically be implemented upon the design and commissioning of the mover system 200, depending upon the particular task to be performed. However, it should be understood that embodiments are envisaged in which the various tasks associated with controlling the mover assemblies 210 may be performed entirely by the segment controller 214, the HLC 216, and/or the PLC 218, or the tasks may be differently distributed among some combination of the segment controller 214, the HLC 216, and the PLC 218.

Figure 4:
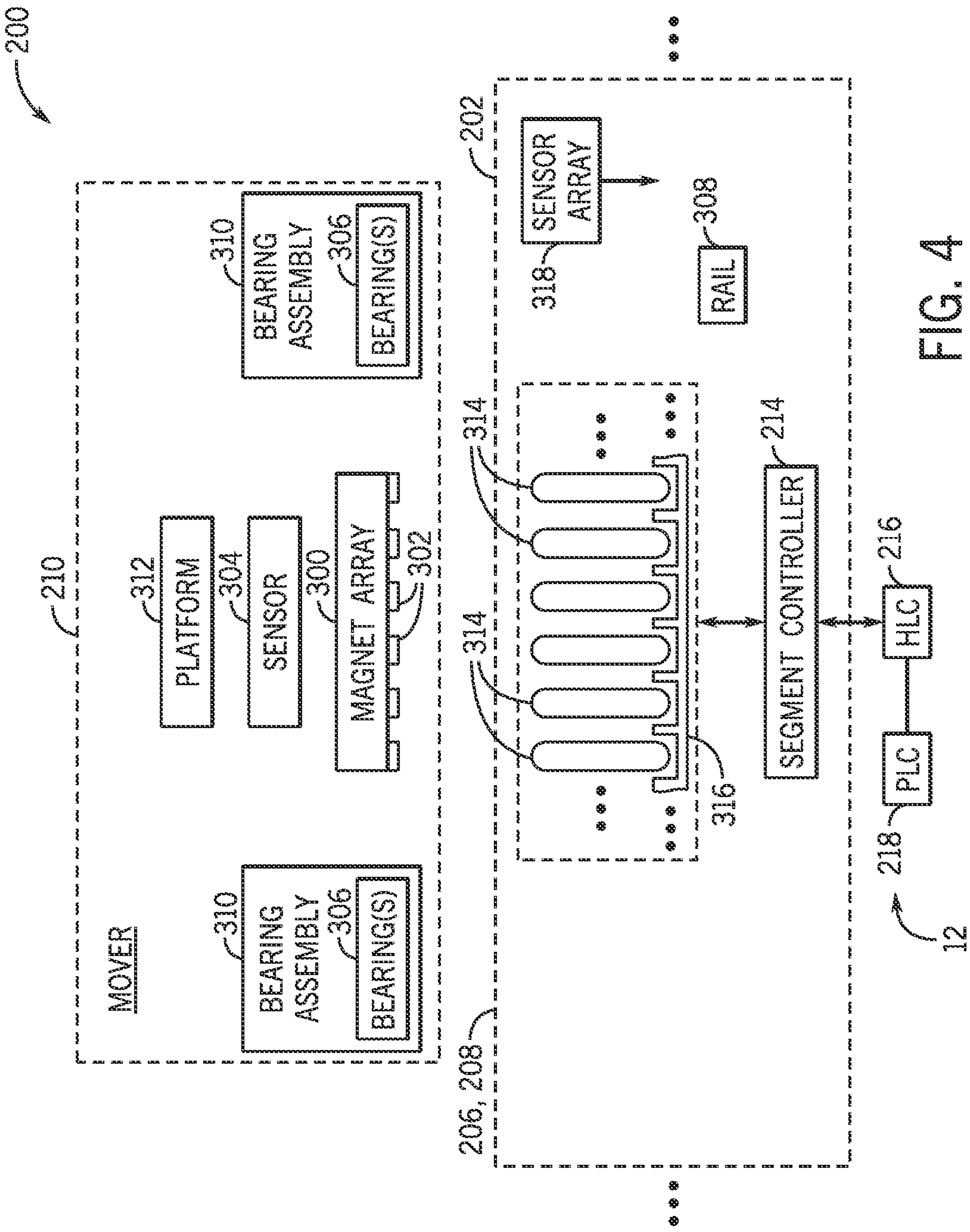
FIG. 4 is a schematic diagram of an embodiment of the mover assembly of the mover system of FIG. 3, in accordance with embodiments of the present disclosure.

FIG. 4 is a schematic diagram of an embodiment of the mover system 200 showing one track section 206, 208 and one mover assembly 210 positioned along the track 202. The track 202 illustrated in FIG. 4 may be the straight track section 206 or the curved track section 208, these two differing in their physical configuration. Each mover assembly 210 may include a magnet array 300 on which a number of magnets 302 may be mounted. The magnets 302 may be permanent magnets mounted such that a small air gap is provided between the coils of the track 202 while the mover assembly 210 is mounted to the track 202. The mover assembly 210 may also include a sensor 304 (e.g., the sensor 16) that may monitor various operations associated with the mover assembly 210. For example, the sensor 304 may include a position sensor, an accelerometer, an inertial measurement unit, a distance sensor, a force sensor, and the like that may monitor a position, velocity, acceleration, load, and so forth of the mover assembly 210. The sensor 304 may additionally include a single axis or multiple axes sensor that may monitor vibration of the mover assembly 210 in different axes. The mover assembly 210 may also include bearings 306 and associated components (e.g., rollers) that may interact with rails 308 of the track 202. The bearings 306 and rails 308 may allow the mover assembly 210 to remain securely attached to the track 202 while allowing relatively free movement of the mover assemblies 210 along the track 202 and supporting mechanical loads and forces encountered during motion. Each mover assembly 210 may include any number of bearing assemblies 310 to couple the bearings 306 to a housing of the mover assembly 210. Each mover assembly 210 may further include a respective platform 312 that may support an object for transportation while the mover assemblies 210 move along the track 202.

The track 202 may include a series of parallel coils 314 that are associated with a stator or armature 316. In currently contemplated embodiments, these coils 314 may be mounted into slots in the stator 316, and the stator 316 itself may be made of magnetic material formed into a stack of laminates and structured to allow for mounting within a housing of the track 202. The segment controller 214 may be included in each track section 206, 208 to allow for controlled power signals to be applied to the coils 314 in order to drive and position the mover assemblies 210 appropriately around the track 202. A sensor array 318 (e.g., including the sensor 16) is provided in each track section 206, 208. The sensor array 318 may provide feedback that can indicate the position of the mover assemblies 210 and can be used to derive velocity, acceleration, jerk, and other motion parameters. As an example, the sensor array 318 may include a vibration sensor secured to (e.g., at an underside of) the rail 308 to monitor vibration caused by movement of the mover assemblies 210 along the rail 308. In the illustrated embodiment, a number of track sections 206, 208 may be mounted end-to-end and interconnected with one another and/or with the HLC 216 to receive signals used to power the coils 314.

As will be appreciated by those skilled in the art, multiple track sections 206, 208, along with the magnet arrays 300 of the mover assemblies 210, may generally form the mover system 200. That is, electromotive force is generated by the controlled fields of the coils 314, and interaction between these fields and the magnetic fields of the magnet array 300 serve to drive the mover assembly 210 into desired positions, at desired speeds, and so forth. The coils 314 may be designed in accordance with various configuration strategies, such as ones having the coils 314 arranged around a periphery of the track 202, ones in which the coils 314 are generally planar (in a top or bottom position of the track 202), and so forth. The segment controller 214, the HLC 216, the PLC 218, or some combination of the controllers may selectively (e.g., independently) cause different coils 314 of different track sections 206, 208 to energize to drive independent movement of the mover assemblies 210, such as to drive a first mover assembly 210 to move at a first speed along a first track section 206, 208 and to drive a second mover assembly 210 to move at a second speed along a second track section 206, 208.

The PLC 218 may receive sensor data and analyze the data to determine whether the mover system 200 is operating as desired. For example, the PLC 218 may compare received sensor data with expected sensor data. Further, the PLC 218 may use sensor data to calculate performance metrics and then compare the calculated performance metrics to expected/benchmark performance metric values, and/or plot calculated performance metrics over time and identify throughput degradation. A deviation between the received sensor data and the expected sensor data, or identified performance degradation, may indicate a deviation from an expected operation (e.g., an identified unexpected operation, an identified anomalous condition, or a discrepancy between an operational state and an expected operation state) of the mover system 200. The comparison between the received sensor data and the expected sensor data may be used to identify devices or machines that are operating in an expected or an unexpected manner. For example, the PLC 218 may identify devices, equipment, and/or machines for which maintenance or modifying operation may be appropriate based on the received sensor data.

Though embodiments shown and described with regard to FIGS. 3 and 4 correspond to independent cart technology (ICT) mover assemblies 210 in which the mover assembly is a passive component driven and actuated by the track 202, it should be understood that the present techniques are not intended to be limited to such embodiments and that the disclosed techniques may be similarly applied to other types of autonomous vehicle systems, such as autonomous mobile robots (AMRs), autonomous guided vehicles (AGVs), hybrid-electric vehicles, unmanned aerial vehicles (UAVs), and so forth, which may or may not move along a track. Moreover, in embodiments in which the present techniques are utilized with autonomous vehicle systems other than ICT mover assemblies (e.g., AMRs, AGVs, UAVs), the track 202 may be defined by routes between areas. For example, in the context of a warehouse, the track 202 may be defined by areas or routes between shelves that a mover or robot may move in or along. As such, the track 202 may be defined by long lines or wires on the floor or by areas that a mover (e.g., mobile robot) may navigate using radio waves, vision cameras, magnets, or lasers.

With the foregoing in mind, the local control system 42 or any other suitable computing system may monitor operations of the mover assemblies 210, transport equipment, machines at fixed locations, and the like to capture sustainability data with regard to the manufacturing of one or more products throughout the course of the manufacturing process in accordance with embodiments described below. By way of example, the local control system 42 may monitor motion data, energy consumption data, stationary machine energy consumption data, and the like with respect to the manufacturing of products at various stages or stations of the industrial automation system 10. The monitored data may be aggregated at each station to determine an aggregated energy dataset for manufacturing each product in the industrial automation system 10 during the course of the manufacturing process until the product is manufactured.

Figure 5:
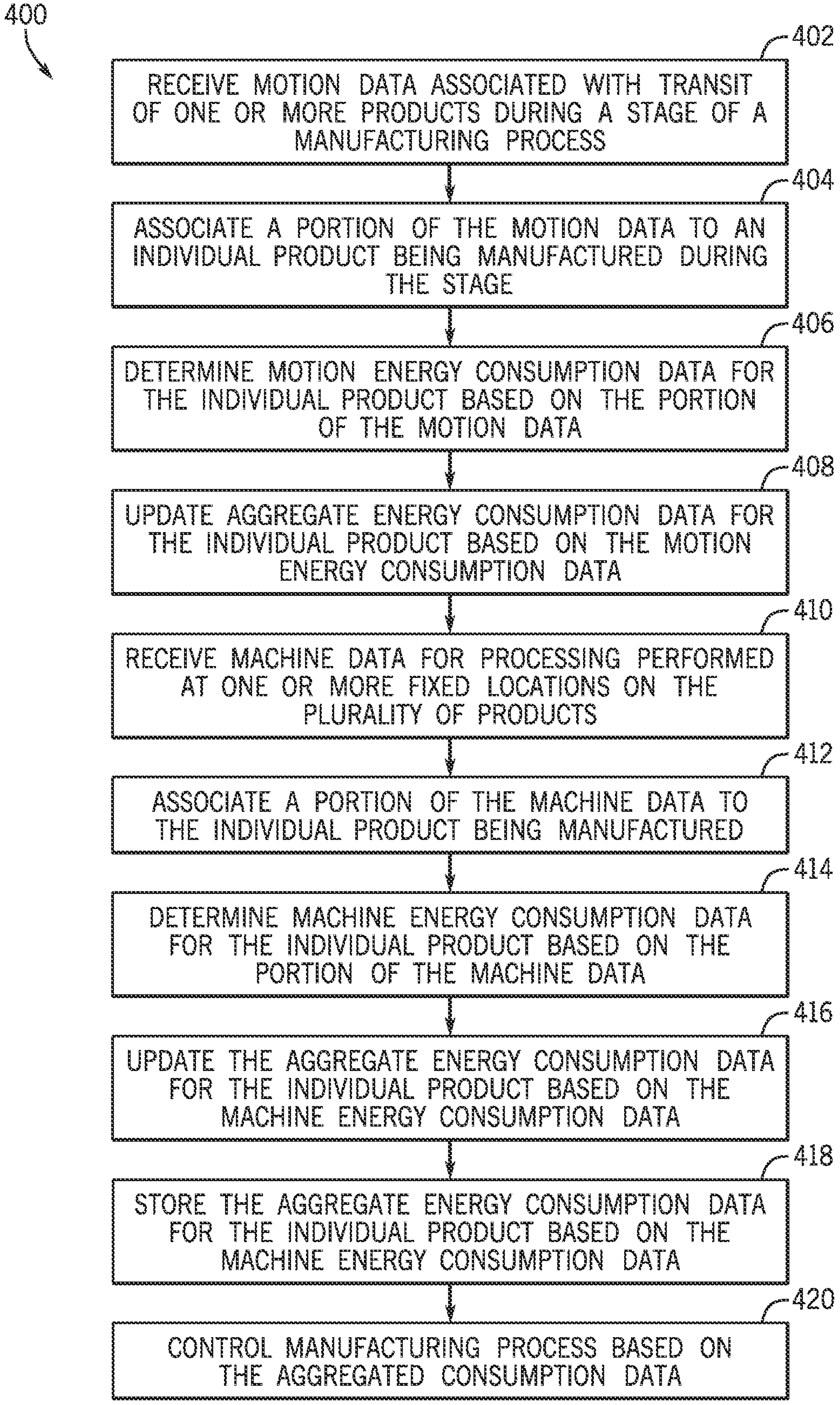
FIG. 5 is a flow diagram of a process for performing sustainability factor consumption analysis, in accordance with embodiments of the present disclosure.

FIG. 5 is a flow diagram of a process 400 for performing sustainability factor consumption analysis, in accordance with embodiments of the present disclosure. The process 400 may be performed by the local control system 42 or a computing device or system included in the industrial automation system 10, such as, but not limited to, the supervisory control system 40, or any other suitable computing device. As described herein, the process 400 may be performed by the local control system 42 at various stations or locations within the industrial automation system 10. That is, the local control system 42, which may be installed at each station, may track motion data and machine data related to operations performed at some stage or portion of the industrial automation system 10 on the products being manufactured. The local control system 42 may determine some sustainability parameter (e.g., energy consumption) related to the tasks performed at the stage of the industrial automation system 10 based on the motion data and the machine data. The sustainability parameters may be stored in a storage component for access by other local control systems 42 or the like.

As an unfinished product travels to each station, the respective local control system 42 may update or aggregate the previously calculated sustainability parameter until the product is complete and store the updated or aggregated sustainability parameter value for the respective product throughout the course of manufacturing. In this way, a more precise sustainability parameter value may be dynamically calculated for each individually manufactured product.

With this in mind, the process 400 may be implemented by one or more processors executing computer-readable instructions that may be stored on the non-transitory storage medium. Furthermore, the process 400 may be implemented via processing circuitry of the local control system 42 or other suitable computing system. As such, while the process 400 is generally described below with reference to the local control system 42, it should be noted that the process 400 may be performed by another device or system. Furthermore, it should be noted that, in some embodiments, operations of the process 400 described below may be omitted or performed in a different order than as discussed below.

At process block 402, the local control system 42 may receive motion data associated with a transit of a one or more products at one location or portion of a manufacturing process of the products. The motion data may provide information related to the motion mechanism or technology used to transport materials, a portion of the products, or the products (e.g., unfinished) to the respective manufacturing station, stage, or location. That is, the local control system 42 may receive the motion data associated with the products during transition (e.g., travel) between one or more fixed locations. As such, the motion data may represent one or more manners in which materials used to manufacture a product traverse or move within the industrial automation system 10. For instance, the motion data may include information related to some materials moving via mover assemblies 210, via a conveyor system, via forklifts, or the like. In some embodiments, the motion of each of the plurality of products may tracked by one or more sensors (e.g., the sensors 16) disposed around the industrial automation system 10, sensors on each mover assembly 210, information provided via the industrial devices 20 that manage the respective motion, and the like. The motion data may include a speed in which mover assemblies 210 move, an acceleration of the mover assemblies 210 an amount of friction in which each of the mover assemblies 210 experience, a payload weight on the respective transport device, and the like. The motion data may also include distance traveled by the products, information related to the mover assembly 210 or other technology employed to move products between each fixed location, motion parameters associated with the mover assembly 210 (e.g., average acceleration, average velocity, braking characteristics, etc.), the weight of the individual product and/or the mover assembly 210 (e.g., from the weight sensor), a type of a conveyor belt transporting the products, drive operating parameters (e.g., voltage, speed) for operating the conveyor belt, stationary times in which products wait at each of the one or more fixed locations, settling times to arrive or park at the fixed locations, transportation times between fixed locations, any other suitable data useful in characterizing motion of the products to the respective station or location within the industrial automation system 10.

In addition to the motion data, the sensors may collect information related to emissions, temperature, vibration, pressure, weight, and the like with respect to implementing or performing each type of motion or moving products throughout the industrial automation system 10 using the respective technology.

After receiving the motion data, at process block 404, the local control system 42 may associate a portion of the motion data to an individual product that traversed the respective motion pathway. That is, the respective motion pathway (e.g., mover assembly 210) associated with the motion data received at block 402 may be attributed to the manufacturing of a group of products. As such, a portion of the motion data collected or observed (e.g., via motion sensors, industrial device data, image sensors, infrared sensors) by the respective local control system 42 may be attributed to a single product. Indeed, if a batch of 10 products, for example, are transported via the respective motion pathway, then the local control system 42 may associate a $10^{th}$ of the motion data to each respective product in the batch. As such, the portion of the motion data that is attributable to transporting one product may be associated to the single product. In some cases, each individual product may be identified with an identifier (e.g., number, code, radiofrequency identification (RFID) tag, and so on), which the local control system 42 may utilize to create an association with corresponding data points with respect to the related motion data.

At process block 406, the local control system 42 may determine motion energy consumption data for the individual product based on the portion of the motion data. As discussed above, the motion data may provide information related to a motion profile (e.g., type of motion, mover, machines used to transport) associated with the movement or motion of products, parts, or material associated with a stage of manufacturing of the individual product. Each portion of the industrial automation system 10 that involves transporting or moving products may be associated with some motion energy consumption model or profile. That is, each different type of motion or transport system (e.g., mover assembly, conveyor, forklift) may consume a certain amount of energy (e.g., kilowatt hours) to perform the respective transport of the respective product. The motion energy consumption model may characterize an expected amount of energy consumed for performing each transport.

Based on the expected, modeled, or monitored energy consumption data for the respective transport method, the local control system 42 may determine motion energy compensation data per product. As an example, the local control system 42 may track data related to the total amount of energy consumed to operate the respective transport technology to reach the respective station. The product of total amount of energy consumed to operate the respective transport technology and the portion of the motion data determined at process block 404 may be calculated to determine the motion energy consumption data for each product.

In some embodiments, the expected energy consumption data may be determined based on an expected energy consumption model for moving a particular transport technology a certain distance with some weighted payload. The energy consumption model may be determined based on manufacturer data related to the respective transport technology, monitored over time with sensors 16 while manufacturing products, calculated based on the motion data received at block 402, and the like.

Further, the local control system 42 may determine the product of the total amount of energy consumption per meter and the distance traveled to obtain a value of energy consumed to over the distance to obtain a value of energy consumed to move the respective one or more products. The result may be characterized as the motion energy consumption data. It should be noted that the motion energy consumption data calculation may include various other factors in the calculation that may affect energy consumption, such as any of the parameters mentioned above. In some cases, energy consumption levels at various times of a day may differ, and varying time periods may be associated with varying levels of energy consumed. For example, the costs of energy (e.g., electrical power in kilowatts per hour) at different times of the day (or different days) may vary. As such, the local control system 42 may account for the varying energy costs when calculating the motion energy consumption data.

In some embodiments, the local control system 42 may associate a portion of the motion energy consumption data to an individual product, as opposed to associating a portion of the motion data to the individual product described in process block 404. In any case, the local control system 42 may attribute an amount of energy to moving the respective product to the respective station associated with the local control system 42.

At process block 408, the local control system 42 may update aggregate energy consumption data for the individual product based on the motion energy consumption data. That is, the local control system 42 may maintain a record, which may include an energy consumption data value for transporting the individual product between each fixed locations of the industrial automation system 10 or the manufacturing process. As such, the local control system 42 may retrieve a current energy consumption value associated with a respective product from a storage component, database, cloud-computing system, or the like. After determining the motion energy consumption data for the product at process block 406, the local control system 42 may add the retrieved current energy consumption data to the calculated motion energy consumption data as aggregated motion energy consumption data for the product. In this way, the motion energy consumption data for the product may be updated throughout the course of manufacturing the product. However, it should be noted that in some embodiments, the local control system 42 may aggregate or update the motion energy consumption data from a number of stations at different stages of or at the end of the manufacturing of the respective product.

In any case, the motion energy consumption data may be determined for transporting the individual product to each of the fixed locations. Since the motion energy consumption data for the individual product may be aggregated (e.g., added, totaled) continuously after determining the motion energy consumption data for the individual product at each fixed location of transport, the local control system 42 may have a record of individual values at each point (e.g., juncture) of transport (e.g., movement) between the one or more fixed locations, which may be updated at each point of travel.

In addition to attributing motion energy consumption data to individual products, the process 400 may also account for energy consumption associated with work or operations performed at fixed locations by machines or the like. With this in mind, at process block 410, the local control system 42 may receive machine data for processing performed on the plurality of products at the respective fixed location. The machine data may include operational data with regard to manufacturing tasks or functions performed by one or more respective machines (e.g., industrial devices 20) at a respective fixed location. By way of example, tasks may include cooling at a cooling station, heating at a heating station, depositing at a deposit station, assembling at an assembly station, testing at a testing station, and so on. In some embodiments, the local control system 42 may receive machine data from the robots 204 related to the tasks performed by the respective robots 204 at the respective location.

After receiving the machine data, at process block 412, the local control system 42 may associate a portion of the machine data to the individual product being manufactured as described above with respect to process block 404. The local control system 42 may attribute the portion of the machine data to the identifier of the product to associate the corresponding data points of the machine data to the individual product.

At process block 414, the local control system 42 may determine machine energy consumption data for the individual product based on the portion of the machine data and energy consumption data associated with the respective machine. For example, the machine data may provide parameters associated with the process performed at the respective station via the respective one or more machines, such as a duration of time the operations were performed, dwell times at each station, a power efficiency of each station, energy consumed by the station, or any other suitable data useful in determining machine energy consumption data. The local control system 42 may utilize the parameters to perform calculations and determine the machine energy consumption for the individual product at each of the one or more fixed locations. For example, the local control system 42 may receive data related to operations performed by the robot 204 or other equipment, such as a cooling station, such as a cooling time (e.g., hours of operation for the cooling station), a cooling capacity (e.g., rate at which heat is removed from the individual product in kW), and efficiency (e.g., efficiency in converting electrical energy into cooling energy). Further, the local control system 42 may receive machine energy consumption data from the industrial automation devices 20, the robots 204, or any suitable device. The machine energy consumption data may include a machine energy model that details an amount of energy consumed for performing certain operations or tasks by the respective machine. In any case, the local control system 42 may determine machine energy consumption data for the individual product by applying the portion of the machine data determined at process block 412 to the machine energy consumption data.

At process block 416, the local control system 42 may update the aggregate energy consumption data determined at process block 408 based on the machine energy consumption data attributable to the product. As described above, the local control system 42 may include the record, which may include the energy consumption data (e.g., the motion energy consumption data and the process energy consumption data). Thus, the aggregate energy consumption data may be updated for the individual product based on the machine energy consumption data determined at each of the fixed locations. That is, the motion energy consumption data determined at each point of travel may be added to the machine energy consumption data determined at each of the one or more fixed locations, and the aggregate energy consumption data may be updated. In this manner, the energy consumed during transportation of the individual product from each station at the one or more fixed locations and the energy consumed on the individual part at each station may be recorded and aggregated.

At process block 418, the local control system 42 may store the aggregate energy consumption data for the individual product based on the process energy consumption data in a storage component or the like. The local control system 42 may send the aggregate energy consumption data to an electronic device associated with a manufacturer, a distributor, a consumer, and the like. The stored data may be retrieved with a query of the product identifier, a batch identifier, or the like.

In some embodiments, at process block 420, local control system 42 may modify operations of equipment (e.g., industrial automation devices 2) of the manufacturing process based on the aggregated consumption data. For example, the local control system 42 may control the traffic flow of each of the individual products of the plurality of products advancing through the manufacturing process to improve the energy consumption values. In some cases, the local control system 42 may implement a digital twin of the industrial automation system 10 and perform simulations (based on the aggregated energy consumption data) using the digital twins to determine traffic flow and guidance of each of the mover assemblies 210 or other equipment transporting each of the individual parts. The digital twin may provide information related to the optimization of scheduling or production of the plurality of products to minimize the total amount of energy consumption during the manufacturing process.

In some embodiments, the local control system 42 may receive data regarding energy consumption of the individual product before manufacture (e.g., when on a shelf of a warehouse), transfer from the warehouse to the industrial control automation system 10 for assembly, transfer from the industrial control automation system 10 to a desired destination (e.g., travel to destination, shipping, and so on), and the like. The data may also include energy consumption while maintaining climate control in a building and/or shipping container (e.g., for the warehouse and/or the individual product), lighting, standby power (e.g., for an electronic device that consumes small amounts of energy while on standby), security systems, electricity, and so on. For example, if the individual product relies on climate control, the energy consumption used in heating, cooling, humidifying, and/or dehumidifying may be received at the local control system 42 and used in determining the aggregate energy consumption data. In any case, the local control system 42 may accumulate energy consumption data related to tasks or operations that occur before or after the manufacturing process and update the aggregated energy consumption data for each product accordingly.

It should be noted that although the flow chart of the process 400 as described above with respect to FIG. 5 determines energy consumption data, the flow chart of operations may similarly be employed to determine other sustainability factor data, such as water consumption data, carbon emissions data, waste data, and so on for the industrial automation system 10. That is, each of the water consumption data, the carbon emissions data, and the waste data may be determined and aggregated at various stages or stations of the industrial automation system 10. The local control system 42 may then also control the manufacturing process based on the aggregated water consumption data, the aggregated carbon emissions data, the aggregated waste data, and the like. In this manner, optimization of scheduling or production of the plurality of products may be performed for different sustainability factors to address various environmental concerns of producers, distributors, and consumers.

In some embodiments, the aggregated sustainability factor data may be collected and produced as a sustainability fact label to provide information related to environmental concerns to the manufacturer, the distributor, and/or the consumer for the individual product. Further, the sustainability fact label may provide information individualized for the consumer, such information related to the tasks performed at each stage of the manufacturing process and delivery process is captured. For example, the sustainability fact label may display the sustainability factor data during each stage of the gathering of materials and parts, manufacturing and assembly of the individual product, warehouse and sorting (e.g., packaging) of the individual product, and delivery of the individual product.

Figure 6:
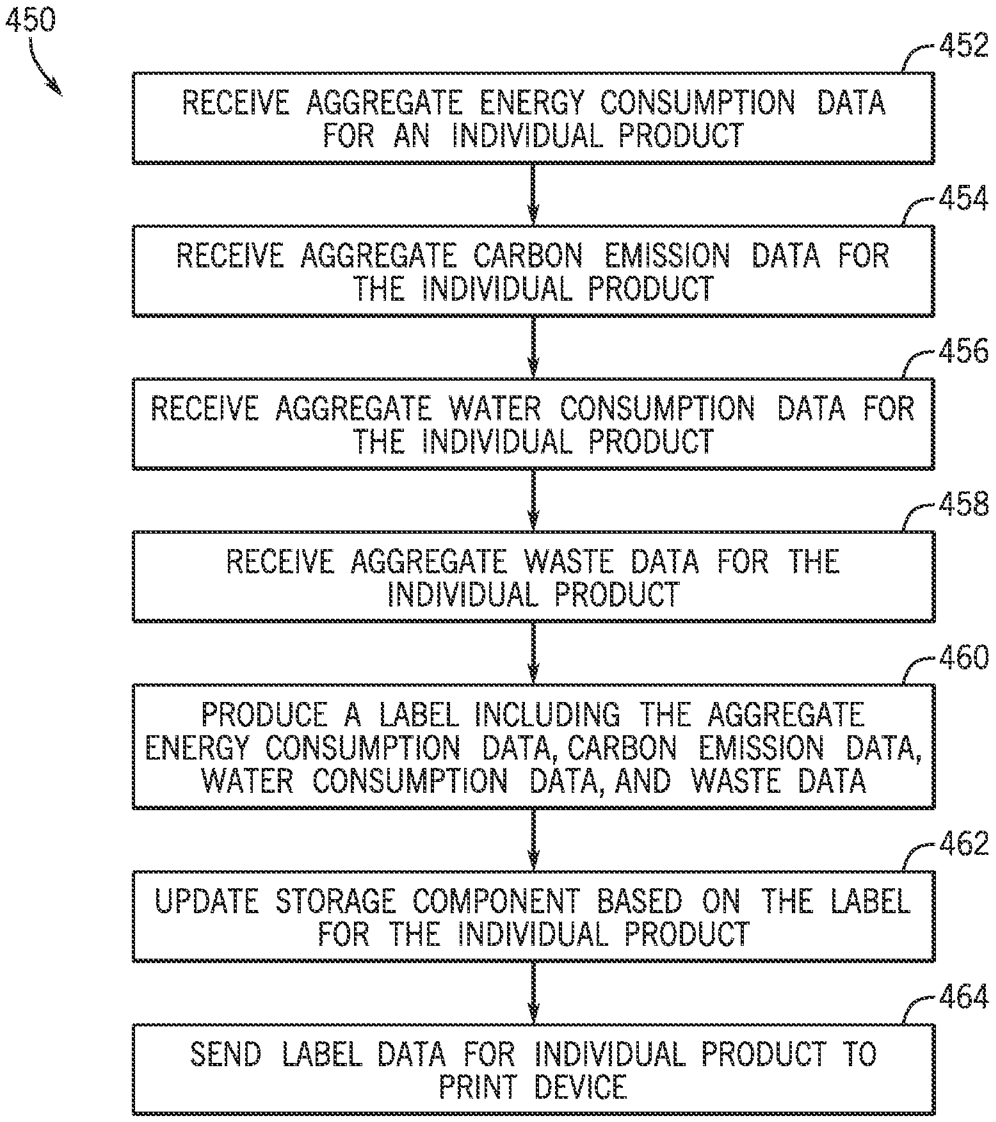
FIG. 6 is a flow diagram of a process for producing a sustainability fact label based on aggregated sustainability factor data, in accordance with embodiments of the present disclosure.

With the foregoing in mind, FIG. 6 is a flow diagram of a process 450 for producing a sustainability fact label based on the aggregated sustainability factor data, in accordance with embodiments of the present disclosure. The process 450 may be performed by the local control system 42 or a computing device as mentioned above and at various stages of the manufacturing process. The process 450 may be implemented by one or more processors executing computer-readable instructions that may be stored on the non-transitory storage medium. Furthermore, the process 450 may be implemented via processing circuitry. As such, while the process 450 is generally described below with reference to the local control system 42, it should be noted that the process 450 may be performed by another device or system. Furthermore, it should be noted that, in some embodiments, operations of the process 450 described below may be omitted or performed in a different order than as discussed below.

As described above, the local control system 42 may determine and aggregate the energy consumption data, the carbon emissions data, the water consumption data, the waste data at various stages of the manufacturing process. Thus, at process block 452, the local control system 42 may receive the aggregate energy consumption data for the individual product. Further, at process block 454, the local control system 42 may receive aggregate the carbon emission data for the individual product. At process block 456, the local control system 42 may receive aggregate water consumption data for the individual product. Moreover, at process block 460, the local control system 42 may receive the aggregate waste data for the individual product.

These datasets may be aggregated or calculated at each station as described above based on data acquired from various sensors, equipment, and the like at each station. For example, the carbon emission data may be interpolated based on the energy consumption data associated with the product and information related to the sources of energy during the production of the respective product. In addition, water consumption data may be acquired by sensors at each station or determined based on water meter data acquired from utility companies associated with the industrial automation system 10 or the like. In the same way, waste data may be acquired from sensors (e.g., image data), user input (e.g., indicative of raw materials discarded), and the like.

Based on the received aggregated data for the different sustainability factors, at process block 462, the local control system 42 may produce a label including the aggregate energy consumption data, the aggregate carbon emission data, the aggregate water consumption data, and/or the aggregate waste data. Additionally, at process block 464, the local control system 42 may update a storage component (e.g., the memory 76) or database based on the label for the individual product. That is, the local control system 42 may add or write information regarding the produced label to the storage component.

At process block 466, the local control system 42 may send label data related to the aggregated sustainability parameters for the individual product to devices, such as a printer or the like. In this manner, the label data may provide information related to sustainability factors for manufacturing and distributing the individual product for a user to review. The label may include a standardized label (e.g., a chart of data), a quick response (QR) code that accesses a network location with the sustainability parameters, a barcode associated with the sustainability parameters as stored in a spreadsheet, or the like. The standardized label may include information related to the collected sustainability factor data. The QR code may include a two-dimensional barcode that may store the sustainability factor data. A consumer may scan the QR code and quickly retrieve the sustainability factor data associated with the individual product. The barcode may include a machine-readable representation of data in the form of lines, patterns, or symbols. The barcode may enable efficient and accurate tracking of the individual product throughout a supply chain and at point-of-sale locations. Thus, the sustainability fact label may enable consumers to address environmental concerns in a more informed manner.

In some embodiments, the local control system 42 may receive additional sustainability factor data relating to the individual product as it is transferred to one or more additional locations. That is, the trajectory of the individual product may be systematically monitored as it is transferred from one location to another. The local control system 42 may update the storage component to include the additional sustainability factor data. Further, the local control system 42 may update the label to include the additional sustainability factor data. In this manner, the path of the individual product and its environmental parameters may be tracked and recorded as it travels from one destination to another.

Keeping the foregoing in mind, the aggregated datasets collected using the processes described above may be tracked and stored for reference purposes. That is, sustainability factor data for subsequent periods of times may be compared to stored sustainability factor data to determine whether the manufacturing process or portions thereof are operating in a sustainability efficient manner. For example, a first dataset of sustainability factors may be compared to a second dataset of sustainability factors to determine updated operations (e.g., a fleet size, a source of energy, a time of day for manufacturing, a geographical region). That is, either the first dataset of sustainability factors or the second dataset of sustainability factors may indicate less energy consumption, carbon emissions, water consumption, and/or waste is consumed. Thus, the local control system 42 may send control signals or adjust operational parameters of the industrial automation system 10, such as a fleet size of a mover system, a source of energy, a time of day, and/or a geographical region to perform certain tasks to improve the overall sustainability factor data for the industrial automation system 10. Additional detail regarding determining updated operational parameters will be discussed below.

Figure 7:
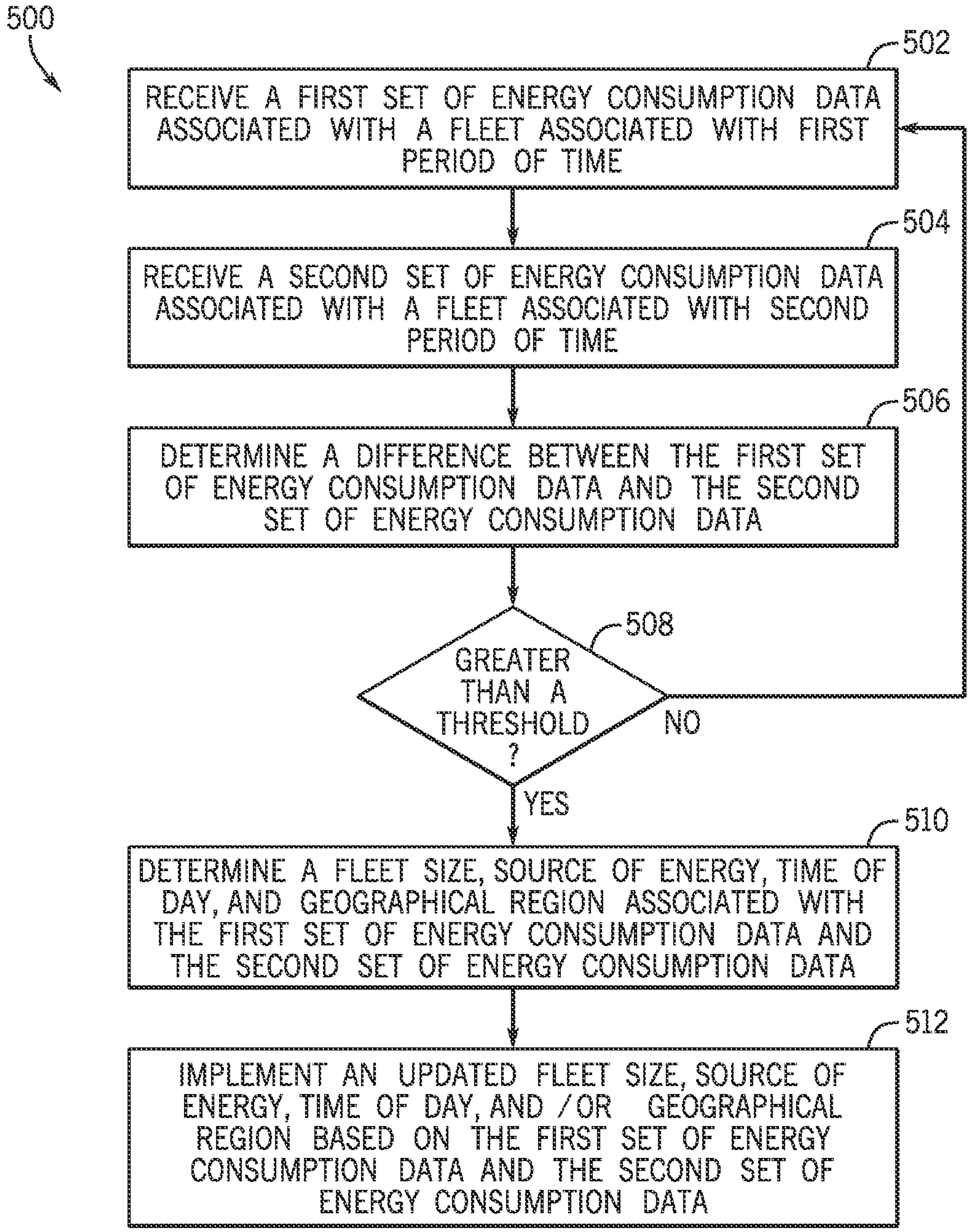
FIG. 7 is a flow diagram of a process for identifying a fleet size, a source of energy, operational time of day, and/or geographical region to improve energy sustainability parameters, in accordance with embodiments of the present disclosure.

With the foregoing in mind, FIG. 7 is a flow diagram of a process 500 for identifying a fleet size, a source of energy, operational time of day, and/or geographical region to improve energy sustainability parameters, in accordance with embodiments of the present disclosure. The process 500 may be performed by the local control system 42 or a computing device or system included in the industrial automation system 10, such as, but not limited to, the supervisory control system 40. The process 500 may be implemented by one or more processors executing computer-readable instructions that may be stored on the non-transitory storage medium. Furthermore, the process 500 may be implemented via processing circuitry. As such, while the process 500 is generally described below with reference to the local control system 42, it should be noted that the process 500 may be performed by another device or system. Furthermore, it should be noted that, in some embodiments, operations of the process 500 described below may be omitted or performed in a different order than as discussed below.

At process block 502, the local control system 42 may receive a first set of energy consumption data associated with a first period of time. As described above, the energy consumption data may include the motion energy consumption data added to the machine energy consumption data (determined at each point of travel and at each fixed station). The period of time may include an interval of time (e.g., 3 days, 1 week, 1 month, and so on). Additionally, at process block 504, the local control system 42 may receive a second set of energy consumption data associated with a second period of time.

At process block 506, the local control system 42 may determine a difference between the first dataset of energy consumption data and the second dataset of energy consumption data. That is, the local control system 42 may compare the first dataset of energy consumption data to the second dataset of energy consumption to determine the difference. In one embodiment, the local control system 42 may implement an algorithm or machine learning techniques to identify patterns and/or to directly compare the first dataset of energy consumption data and the second dataset of energy consumption data. For example, the local control system 42 may determine the second dataset of energy consumption data is a larger value (e.g., more energy is consumed in the second dataset of energy consumption data) than the first dataset of energy consumption data.

At process block 508, the local control system 42 may determine if the difference is greater than a threshold. The threshold may include a predefined value range, which represents the allowable difference between the first dataset of energy consumption data and the second dataset of energy consumption data. If the local control system 42 determines the difference is not greater than the threshold (e.g., the difference is within an acceptable rage), then the local control system 42 may proceed to process block 502. However, if the local control system 42 determines the difference is greater than the threshold, then the local control system 42 may proceed to process block 510.

At process block 510, the local control system 42 may determine a fleet size (number of the mover assemblies 210), a source of energy (e.g., electricity, fossil fuels, renewable energy, and so on), a time of day, and a geographical region associated with each of the first dataset of energy consumption data and the second dataset of energy consumption data. By determining parameters such as the fleet size, the source of energy, the time of day, and the geographical region associated with the first dataset of energy consumption data and the second dataset of energy consumption data, the local control system 42 may determine the parameters that may result in a more efficient amount of energy consumption. For example, more energy consumption may occur during day time than at night time and/or more energy consumption may occur in a western region of a country than an eastern region of the country.

Thus, at process block 512, the local control system 42 may implement an updated fleet size, source of energy, time of day, and/or geographical region based on the first dataset of energy consumption data, the second dataset of energy consumption data, or both. That is, the local control system 42 may implement the parameters that may result in less energy consumption as identified in the first dataset of energy consumption or the second dataset of energy consumption data. For example, the first dataset of energy consumption may indicate the use of the renewable energy as the source of energy and the second dataset of energy consumption data may indicate the use of the fossil fuels as the source of energy. The second dataset of energy consumption data may be the larger value than the first dataset of energy consumption data. Therefore, the local control system 42 may request to implement the updated source of energy as the renewable energy to improve energy consumption.

It should be noted that although the flow chart of the process 500 as described above with respect to FIG. 7 determines energy consumption data, the flow chart of operations may similarly be employed to perform updates based on other sustainability factor data, such as the water consumption data, the carbon emissions data, the waste data, and so on for the industrial automation system 10. The local control system 42 may then implement updated parameters based on the water consumption data, the carbon emissions data, and/or the waste data. In this manner, optimization of scheduling or production of the plurality of products may be performed for different sustainability factors to address various environmental concerns of producers, distributors, and consumers. It should be noted that the fleet size may be designed, controlled, and/or implemented in alternative manners, as will be described in further detail below.

Figure 8:
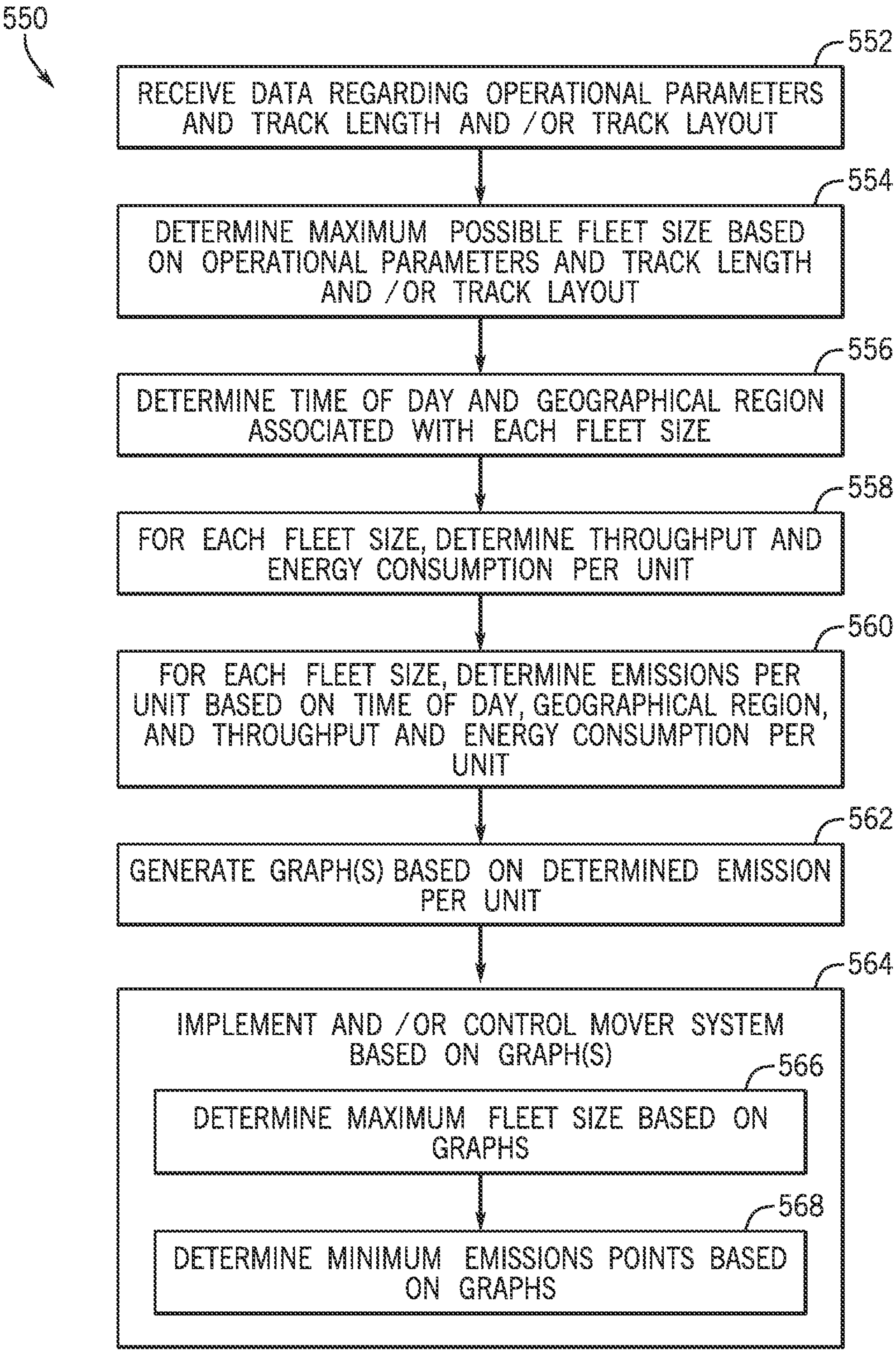
FIG. 8 is a flow diagram of a process for designing and/or controlling a mover system based on expected emissions per unit, in accordance with embodiments of the present disclosure.

FIG. 8 is a flow diagram of a process 550 for designing and/or controlling a mover system 200 based on expected emissions per unit, such as the mover system 200 or any other mover system. The process 550 may be performed by the local control system 42 or a computing device or system included in the industrial automation system 10, such as, but not limited to, the supervisory control system. The process 550 may be implemented by one or more processors executing computer-readable instructions that may be stored on the non-transitory storage medium. Further, the process 550 may be implemented via processing circuitry. While the process 550 is generally described below with reference to the local control system 42 and the mover system 200, it should be noted that the process 550 may be performed by other another device or system. Furthermore, it should be noted that, in some embodiments, operations of the process 550 described below may be omitted or performed in a different order than as discussed below.

At process block 552, the local control system 42 may receive data regarding operational parameters, track length, a track layout of a mover system 200, or any combination thereof. Operational parameters may include, but are not limited to, costs of energy (e.g., electrical power in megawatts per hour) at different times, one or more target throughputs (e.g., amounts of units to be produced or generated using the mover system 200), motion parameters associated with movers (e.g., maximum acceleration, maximum velocity, braking characteristics, etc.), a size or sizes of the mover assembly 210, dwell times for particular stations, settling times, carbon impact associated with electrical energy consumption (e.g., based on energy source being renewable or non-renewable and/or time of day at which energy sources are available), overall environmental impact associated with electrical energy consumption (which may include the carbon impact), or any combination thereof. The track layout may be a mapping of a mover system 200 that may be indicative of the layout of the mover system 200, the location(s) of station(s) within the mover system 200, the location(s) of robot(s) or other automation devices in the mover system 200, or any combination thereof. Furthermore, the track length may be a distance of track included in the mover system 200 as well as distances of portions of the track (e.g., a distance from one station to a next station within the mover system 200). The data the local control system 42 receives at process block 552 may be received via a user input or accessed from a data repository (e.g. on the memory 76 or the storage 78 of the local control system 42 or communicatively coupled to the local control system 42) or via an Internet search.

At process block 554, the local control system 42 may determine a maximum possible fleet size based on the data received at process block 552. The maximum possible fleet size may be a value that is equal to the highest possible number of movers that will fit onto the track of a mover system 200 (e.g., based on the track length and the size(s) of the mover(s)). In one embodiment, the maximum possible fleet size may be determined based solely on the track layout, the length of track, or both. Additionally, the maximum possible fleet size may be determined based on simulations performed by the local control system 42. For example, the local control system 42 may generate and/or implement digital twins of the mover system 200 and perform simulations (based on the data received at process block 552) using the digital twins to determine a maximum number of movers that may be included in the mover system 200. Furthermore, the maximum number of movers may be determined (e.g., in existing mover systems 200) by physically placing movers (e.g. mover assemblies 210) within the mover system 200 (e.g., on the track 202). While discussed below, the maximum number of movers may also include movers that may be stationary (e.g., in a "parking lot") during operation of the mover system 200.

At process block 556, the local control system 42 may determine the time of day and the geographical region associated with each fleet size of the fleet sizes that may be implemented in the mover system 200. That is, the local control system 42 may determine the time of day the mover system 200 is in use for manufacturing and the geographical region in which the mover system 200 is placed. The fleet sizes may include any number of movers that is equal to or less than the maximum possible fleet size determined at process block 554. Further, carbon emission may be a function of a time of day and a geographical region in which the consumed energy is produced. That is, the carbon emissions may fluctuate based on the time of day and the geographical region.

Figures 9, 10:
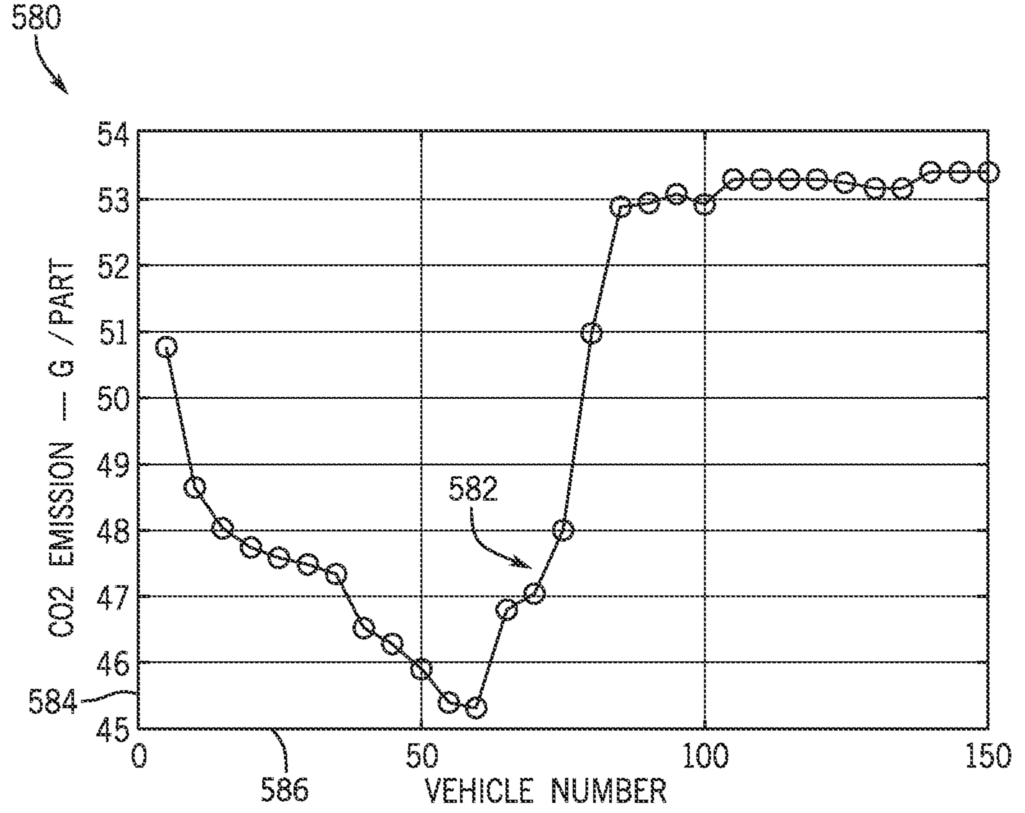
FIG. 9 is a chart indicative of expected emissions data at various geographical regions, in accordance with embodiments of the present disclosure.
FIG. 10 is a graph indicative of expected carbon emissions per number of movers in a mover system, in accordance with embodiments of the present disclosure.

For example, FIG. 9 illustrates a chart 572 with various geographical regions (as indicated by 574) and associated expected emissions data (e.g., CO2 factor) (as indicated by 576). As shown in FIG. 9, the emissions may vary depending on the geographical region the manufacturing is taking place. As an example, manufacturing in the United States (U.S.) may produce less emissions than manufacturing in South Australia. Moreover, the emissions data may vary by a northern region, a southern region, a western region, and an eastern region within the geographical region. As another example, manufacturing within the east China grid may produce less emissions than manufacturing within the central China grid.

Returning back to FIG. 8, at process block 558, the local control system 42 may determine throughput (e.g., units or parts produced in a particular time period, such as a minute) and energy consumption per unit produced for fleet sizes that may be implemented in the mover system 200. Similar to process block 554, the local control system 42 may determine the throughputs and energy consumptions by performing simulations of the mover system 200. In other embodiments, the throughputs and energy consumptions may be determined partially or entirely based on data collected during operation of the mover system 200 (or in combination with simulations), as described above. In other embodiments, (e.g., in existing mover systems 200), the throughputs and energy consumptions may be actual throughputs and energy consumptions of a mover system 200. For example, the mover system 200 may be controlled to operate using several different operating conditions (e.g., number of movers, acceleration and/or braking parameters of movers, etc.), and the throughputs and energy consumptions may be measured. It should be noted that the energy consumptions may be specific to the mover system 200. That is, the energy consumptions may be amounts of electrical power utilized by the mover system 200 to perform an entire production of a unit (e.g., an item produced) or a portion of the entire production of a unit.

In embodiments in which the mover system 200 is utilized to perform a (less than entire) portion of the production of a unit, the energy consumptions may be amounts of power associated with the entire production of the unit. As such, the energy consumptions or values reflecting amounts of energy consumed (e.g., per part or unit produced), may be indicative of electrical power utilized by the mover system 200 and other components (e.g., of the industrial automation system) not included in the mover system 200.

At process block 560, the local control system 42 may determine emissions per unit based on the time of day, the geographical region, and the throughput and energy consumption per unit. Similar to process block 558, the local control system 42 may determine the emissions per unit by performing simulations of the mover system 200. In other embodiments, the emissions per unit may be determined partially or entirely based on data collected during operation of the mover system 200 (or in combination with simulations). In other embodiments, the emissions per unit may be actual emissions per unit of the mover system 200. For example, the mover system 200 may be controlled and operated using several different operating conditions (e.g., the number of movers, the acceleration and/or braking parameters) at a particular time of day in a particular geographical region, and the emissions per unit may be measured. That is, the emissions per unit may be amount of emissions produced by the mover system 200 to the entire production of the unit (e.g., the item produced) or a portion of the entire production of the unit. In other embodiments, the emissions per unit may be directly correlated to the throughput and energy consumption per unit, and thus, the throughput and energy consumption may be used to determine the emissions per unit. In yet another embodiment, the emissions data per unit may be determined by multiplying electrical power by an emission factor.

Figure 11:
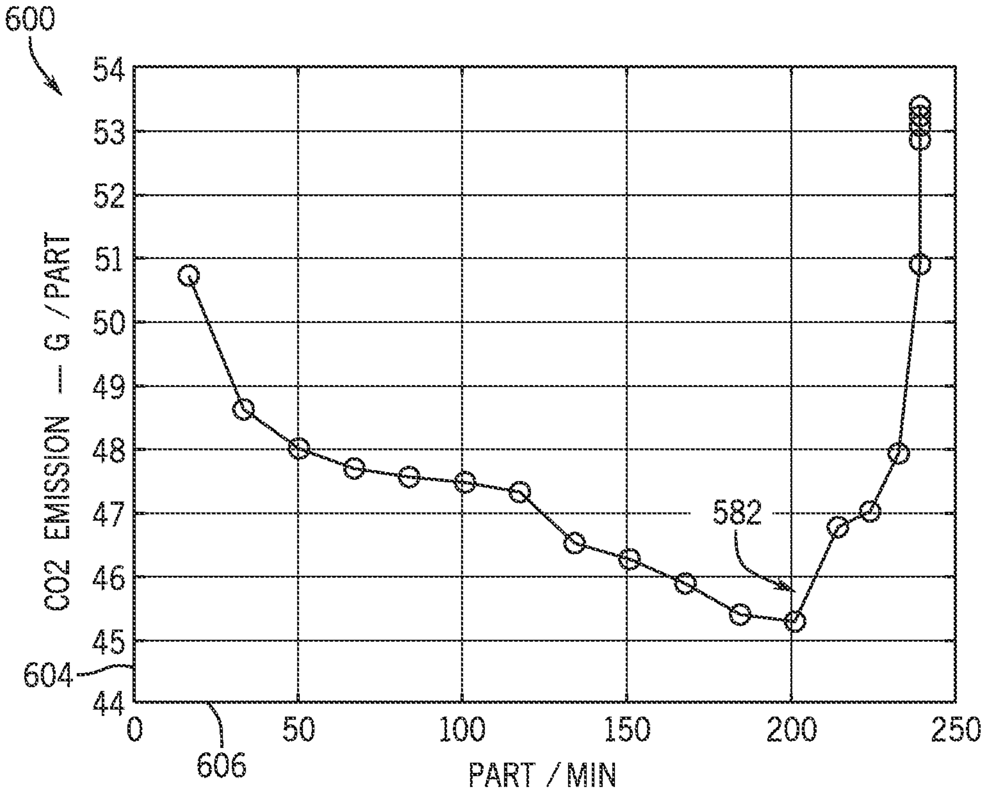
FIG. 11 is a graph indicative of expected carbon emissions versus number of parts produced by the mover system per minute, in accordance with embodiments of the present disclosure.

At process block 562, the local control system 42 may generate one or more graphs based on the determined emissions per unit determined at process block 560. To help provide more context, FIGS. 10-12 are examples of graphs that may be generated by the local control system 42 at process block 562. In particular, FIG. 10 is a graph 580 of a line 582 indicative of expected carbon emissions (in grams per part produced, as indicated by axis 584) per number of movers in the mover system 200 (as indicated by axis 586). FIG. 11 is a graph 600 of a line 602 indicative of expected carbon emissions (in grams per part produced as indicated by axis 604) versus number of parts produced by the mover system 200 per minute (as indicated by axis 606). FIG. 12 is a graph 620 of a first line 622, a second line 624, a third line 626, and a fourth line 628 indicative of expected carbon emissions (in grams per part produced as indicated by 630) versus the number of parts produced by the mover system 200 per minute (as indicated by axis 632). Each line of the graph 620 may be associated with a different region within the geographical region. For example, the first line 622 may be associated with the western region of China, the second line 624 may be associated with the central region of China, the third line 626 may be associated with the southern region of China, and the fourth line 628 may be associated with the eastern region of China.

It should be noted that the emissions data (in the graphs 580, 600, 620) may be specific to a mover system 200 or generally the entire production of a unit, including portions of the production of the unit performed without using the mover system 200. In other words, in one embodiment, the graphs 580, 600, 620 may be indicative of emissions produced by the mover system 200 (e.g., a portion (specific to the mover system 200) of a total amount of emissions produced to produce one unit) or the total emissions produced to produce the unit (e.g., an amount of electrical power consumed by the mover system 200 and other components (e.g., of the industrial automation system 10) outside of the mover system 200). Moreover, in other embodiments, other graphs may be generated process block 562 in addition to, or in the alternative to, one or more of the graphs 580, 600, 620. Such graphs may relate to other sustainability factors. For example, other graphs generated at process block 562 may plot water consumption, waste data, or energy consumption in total or per unit produced against the number of movers utilized or the number of units produced per minute.

Furthermore, as the graphs 580, 600, 620 (or any other graphs generated at process block 562) may be generated (partially or wholly) utilizing data generated from operating the mover system 200 (e.g., sensor data, production data, electrical power consumption data, etc.), the graphs 580, 600, 620 may reflect or be indicative of how particular operating variables vary. For example, in the context of the graph 600, the number of parts produced per minute may be determined (and then plotted on the graph 600) by implementing and testing the mover system 200 using different numbers of movers and measuring the emissions. As another example, in context of the graph 580 the amount of emissions produced for a particular number of movers may be determined (and then plotted on the graph 580) by implementing and testing a mover system 200 using different numbers of movers and measuring the emissions produced. As yet another example, in the context of the graph 620, the amount of emissions per part produced may be determined (and then plotted on the graph 600) by implementing and testing a mover system 200 using different numbers of movers and measuring the amount of emissions produced (per part produced) at various geographical regions.

Returning to FIG. 8, and the discussion of the process 550, at process block 564, the local control system 42 may send control signals to the mover system 200 based at least in part on the graph(s) generated at process block 562. In some embodiments, process block 564 may be implemented also based on the data received at process block 452. That is, the mover system 200 may also be implemented (e.g., initialized) having a number of movers less than or equal to the maximum number of movers based on the operational parameters, the track length, and/or the track layout. Process block 564 may also include determining a maximum fleet size (e.g., number of movers) based on the graph(s) (sub-process block 566) and determining one or more minimal emission points (sub-process block 568). The maximum fleet size may be equal to or less than the maximum possible fleet size. In some embodiments, the maximum fleet size may be a number of movers (based on the graph(s) (e.g., graph 580)) that corresponds to the lowest number of emissions per part produced. The one or more minimal emission points may be absolute minima or local minima within the graphs 580, 600, 620. As such, the mover system 200 may be implemented (e.g., initialized) having a number of movers equal to or less than the maximum number of movers, and the mover system 200 may be controlled (e.g., by the local control system 42). For example, acceleration and velocity parameters (e.g., minimum and maximum acceleration and/or velocity values for movers) may be determined, and the mover assemblies 210 may be controlled to operate within such parameters.

In some embodiments, the track 202 may include a first portion and a second portion. The local control system 42 may determine a number of the mover assemblies 210 that will be utilized on only the first portion of the track 202 or both the first portion of the track and the second portion of the track. Additionally or alternatively, the local control system 42 may determine a number of the mover assemblies 210 that may be parked in the second portion of the track 202 (e.g., when only the first portion of the track 202 is to be utilized), or vice versa, one or more accelerations and/or velocities for the mover assemblies 210, or any combination thereof. Further, in some embodiments, the mover system 200 may be operated as desired by a user (as indicated by a user's input).

With the foregoing in mind, FIG. 13 is a flow diagram for identifying an anomaly in the mover system 200 based on aggregated emissions data, in accordance with embodiments of the present disclosure. The process 650 may be performed by the local control system 42 or a computing device or system included in the industrial automation system 10, such as, but not limited to, the supervisory control system 40. The process 650 may be implemented by one or more processors executing computer-readable instructions that may be stored on the non-transitory storage medium. Furthermore, the process 650 may be implemented via processing circuitry. As such, while the process 650 is generally described below with reference to the local control system 42, it should be noted that the process 650 may be performed by another device or system. Furthermore, it should be noted that, in some embodiments, operations of the process 650 described below may be omitted or performed in a different order than as discussed below.

At process block 652, the local control system 42 may aggregate emissions per unit data for each of a plurality of time periods. That is, the local control system 42 may add and/or total the emissions per unit data for a specified time period (for multiple time periods) for the plurality of time periods. Further, at process block 654, the local control system 42 may store the aggregated emissions per unit data for each of the plurality of time periods. The local control system 42 may store the aggregated emissions per unit data on the memory 76 or the storage 78 of the local control system 42 or any suitable storage communicatively coupled to the local control system 42.

At process block 656, the local control system 42 may compare each of the aggregated emissions per unit data for each of the plurality of time periods (e.g., weeks, months, and so on). That is, the local control system 42 may check and compare an amount of aggregated emissions per unit data for each of the plurality of time periods to one another. For example, the local control system 42 may compare the amount of a first aggregated emissions per unit data for a first month to the amount of a second aggregated emissions per unit data for a second month. It should be noted that although a month is used as an example, any suitable time period may be implemented as a time period.

At process block 658, the local control system 42 may detect a change in each of the aggregated emissions per unit data. Indeed, the local control system 42 may detect if the aggregated emissions per unit data has undergone the change by increasing, decreasing, or remaining similar (or the same) for each of the plurality of time periods. The increase in the aggregated emissions per unit data may indicate that an anomaly has occurred within the mover system 200, and is thus causing higher emissions per unit in each of the plurality of time periods. If at process block 658, a change is not detected (e.g., no change in each of the aggregated sets of data), then the local control system 42 may return to process block 652. The local control system 42 may then perform the process 650 again as described above to continuously monitor aggregated emissions per unit data for each of the plurality of time periods. However, if at process block 658, the change is detected and is increasing, the local control system 42 may proceed to process block 660.

At process block 660, the local control system 42 may determine if the same energy source is being used for the mover system 200. For example, the mover system 200 may be powered by a renewable energy source and the local control system 42 may determine if the renewable energy source is still providing energy to the mover system 200. If at process block 660, the local control system 42 determines the energy source has been changed (e.g., is different), then the local control system 42 may return to process block 652. The local control system 42 may then perform the process 650 again as described above to continuously monitor aggregated emissions per unit data for each of the plurality of time periods. However, if at process block 660, the local control system 42 determines the same energy source is providing energy to the mover system 200, then the local control system 42 may proceed to process block 662.

At process block 662, the local control system 42 may identify the anomaly associated with the change in each of the aggregated emissions per unit data. For example, the anomaly may be associated with damaged movers, sensors, mechanical components, mechanical imbalances, improper tuning of the mover system 200, excessive wear and tear, synchronization issues, slippage (e.g., the mover fails to securely hold the individual product or component), environmental interference, and so on. For example, the anomaly may be that the bearings 306 may be worn-down. The bearings 306 being worn-down may result in inefficiency and improper operation and transportation of the individual product and/or the component within the mover system 200. As described above, in some embodiments, energy consumption may be correlated to emissions. Thus, more energy being consumed to move the individual product and/or component due to the wearing down of the bearings 306 may result in a higher production of emissions per unit. Thus, the anomaly may result from the wearing down of the bearings 306.

In an embodiment, the anomaly may be identified based on the aggregated emissions per unit data. For example, a statistical analysis may be performed on each of the aggregated emissions per unit data to identify data points that significantly deviate from the mean and/or median. The outliers of the data points may be indicative of the anomaly in the mover system 200. In another embodiment, a pattern recognition technique (e.g., a machine learning algorithm) may be employed by the local control system 42 to identify regular patterns in each of the aggregated emissions per unit data. The local control system 42 may identify the anomaly based on deviations from the regular patterns, which may indicate the anomaly. As an example, a mover of the mover system 200 may be damaged. Thus, more energy may be consumed when transporting the mover from a fixed station to another fixed station. As a result, more emissions may be produced and the pattern in each of the aggregated emissions per unit data may deviate as the mover moves from the fixed station to the other fixed station. Therefore, the anomaly within the mover system 200 of the damaged mover may be identified. In yet another embodiment, comparative analysis may be performed. That is, each of the aggregated emissions per unit data may be compared to one another to reveal and identify the anomaly based on differences in each of the aggregated emissions per unit data.

At process block 664, the local control system 42 may send an alert indicative of the anomaly to a computing device of a user. The alert may include any suitable command that causes the computing device (e.g., mobile computing device) to produce an audio (e.g., an alarm) or visible indication (e.g., a notification displayed on a display of the computing device) that may notify the user of the anomaly. In some embodiments, the command may cause the computing device to automatically execute an application or produce the alert while in a sleep mode, low power mode, while the application is not being executed, or the like. In another embodiment, the alert may include a control signal that may adjust one or more operations of the mover system 200. For example, the control signal may cause the mover system 200 to stop operating for a period of time. In yet another embodiment, the alert may include a wireless signal sent to an application running on the user's computing device. The user may then be notified of the anomaly via the application.

By using the disclosed techniques, mover systems may be designed, implemented, and controlled to enable production within desired environmental parameters. Furthermore, the number of movers within the mover system may be increased or decreased to adjust the environmental impact of the mover system. Accordingly, use of the disclosed techniques may cause an industrial automation system to improve determinations of sustainability factor data and perform adjustments to improve sustainability factor consumption.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A mover system comprising:

a track;

a plurality of movers configured to move along the track, the plurality of movers comprising a first number of movers corresponding to a first fleet size and a second number of movers corresponding to a second fleet size; and one or more processors configured to:

determine a first amount of energy consumption associated with the first fleet size and a second amount of energy consumption associated with the second fleet size;

determine a first time of day that the first number of movers are in use and a second time of day that the second number of movers are in use;

determine a first emissions per unit for each mover of the first number of movers based on the first amount of energy consumption and the first time of day and a second emissions per unit for each mover of the second number of movers based on the second amount of energy consumption and the second time of day;

determine one or more operating settings for the mover system based on the first emissions per unit, the second emissions per unit, or both; and send one or more commands to the first number of movers, the second number of movers, or both based on the one or more operating settings, wherein the one or more commands cause at least one of the plurality of movers to be powered down, powered up, parked, or any combination thereof.

2. The mover system of claim 1, wherein the one or more processors are configured to receive data indicative of one or more operational parameters of each of the plurality of movers, a length of the track, a layout of the track, or any combination thereof.

3. The mover system of claim 2, wherein the one or more processors are configured to determine a maximum number of the plurality of movers used in the mover system based on the one or more operational parameters, the length of the track, the layout of the track, or any combination thereof.

4. The mover system of claim 3, wherein the one or more operational parameters comprise a minimum throughput of the mover system, a maximum throughput of the mover system, a maximum amount of electrical power per unit produced, a maximum cost for electrical power per unit produced, a number of movers of the plurality of movers to be used, or any combination thereof.

5. The mover system of claim 3, comprising an electronic display configured to display the one or more operational parameters for the mover system.

6. The mover system of claim 1, wherein the one or more processors are configured to generate one or more graphs based on the first emissions per unit, the second emissions per unit, or both.

7. The mover system of claim 6, wherein the one or more graphs are indicative of carbon emissions per part produced with respect to the first number of movers, the second number of movers, or both.

8. The mover system of claim 6, wherein the one or more processors are configured to:

determine a maximum number of movers of the mover system based on the one or more graphs;

determine one or more minimal carbon emission points based on the one or more graphs; and determine the one or more commands based on the maximum number of movers, the one or more minimal carbon emission points, or both.

9. The mover system of claim 1, wherein the track comprises a first portion and a second portion, wherein the one or more operating settings comprise a number of the plurality of movers to be parked in the second portion.

10. The mover system of claim 1, wherein the one or more processors are configured to receive:

a user input indicative of a minimum value and a maximum value of emissions per unit, a minimum value and a maximum value of energy consumption, a minimum number and a maximum number of movers, a minimum value and a maximum value of acceleration, a minimum value and a maximum value of velocity, or any combination thereof; and determine the one or more commands based on the user input.

11. The mover system of claim 1, wherein the one or more processors are configured to:

aggregate the emissions per unit data for each of a plurality of time periods; and store the aggregated emissions per unit data for each of the plurality of time periods.

12. The mover system of claim 1, wherein the one or more commands cause at least one mover of the first number of movers or at least one mover of the second number of movers to be powered down, powered up, parked, or any combination thereof.

13. A non-transitory computer-readable medium comprising instructions that, when executed by one or more processors, cause the one or more processors to:

determine a first amount of energy consumption associated with a first fleet size of movers comprising a first number of movers of a plurality of movers and a second amount of energy consumption associated with a second fleet size of movers comprising a second number of movers of the plurality of movers;

determine a first time of day that the first number of movers are in use and a second time of day that the second number of movers are in use;

determine a first emissions per unit for each of the first number of movers based on the first amount of energy consumption and the first time of day and a second emissions per unit for each of the second number of movers based on the second amount of energy consumption and the second time of day;

determine one or more operating settings for the plurality of movers based on the first emissions per unit, the second emissions per unit, or both; and send one or more commands to the first number of movers, the second number of movers, or both based on the one or more operating settings, wherein the one or more commands cause at least one mover of the plurality of movers to be powered down, powered up, parked, or any combination thereof.

14. The non-transitory computer-readable medium of claim 13, wherein the instructions, when executed, cause the one or more processors to receive data indicative of one or more operational parameters of each of the plurality of movers, a length of a track, a layout of the track, or any combination thereof.

15. The non-transitory computer-readable medium of claim 14, wherein the instructions, when executed, cause the one or more processors to determine a maximum number of the plurality of movers used based on the one or more operational parameters, the length of the track, the layout of the track, or any combination thereof.

16. The non-transitory computer-readable medium of claim 13, wherein the instructions, when executed, cause the one or more processors to generate one or more graphs based on the first emissions per unit, the second emissions per unit, or both.

17. The non-transitory computer-readable medium of claim 13, wherein the instructions, when executed, cause the one or more processors to:

aggregate the emissions per unit data for each of a plurality of time periods; and store the aggregated emissions per unit data for each of the plurality of time periods.

18. A method, comprising:

determining, via processing circuitry, a first amount of energy consumption associated with a first number of movers corresponding to a first fleet size of a plurality of movers and a second amount of energy consumption associated with a second number of movers corresponding to a second fleet size of the plurality of movers;

determining, via the processing circuitry, a first time of day that the first number of movers are in use and a second time of day that the second number of movers are in use;

determining, via the processing circuitry, a first emissions per unit for each mover of the first number of movers based on the first amount of energy consumption and the first time of day and a second emissions per unit for each mover of the second number of movers based on the second amount of energy consumption and the second time of day;

determining, via the processing circuitry, one or more operating settings for the plurality of movers based on the first emissions per unit, the second emissions per unit, or both; and sending, via the processing circuitry, one or more commands to the first number of movers, the second number of movers, or both based on the one or more operating settings, wherein the one or more commands cause at least one of the plurality of movers to be powered down, powered up, parked, or any combination thereof.

19. The method of claim 18, comprising generating, via the processing circuitry, one or more graphs based on the first emissions per unit, the second emissions per unit, or both.

20. The method of claim 18, comprising:

aggregating, via the processing circuitry, the emissions per unit data for each of a plurality of time periods; and storing, via the processing circuitry, the aggregated emissions per unit data for each of the plurality of time periods.

* * * * *